(12) United States Patent
Miyata

(10) Patent No.: US 10,457,278 B2
(45) Date of Patent: Oct. 29, 2019

(54) LANE CHANGING SUPPORT APPARATUS

(71) Applicant: TOYOTA JIDOSHA KABUSHIKI KAISHA, Toyota-shi, Aichi (JP)

(72) Inventor: Shunsuke Miyata, Susono (JP)

(73) Assignee: TOYOTA JIDOSHA KABUSHIKI KAISHA, Tokai-shi, Aichi-ken (JP)

( * ) Notice: Subject to any disclaimer, the term of this patent is extended or adjusted under 35 U.S.C. 154(b) by 0 days.

(21) Appl. No.: 16/002,569

(22) Filed: Jun. 7, 2018

(65) Prior Publication Data

US 2018/0354510 A1  Dec. 13, 2018

(30) Foreign Application Priority Data

Jun. 9, 2017  (JP) ................. 2017-114771

(51) Int. Cl.
*B60W 30/09* (2012.01)
*B60W 10/20* (2006.01)
*B60W 30/18* (2012.01)
*B60W 30/14* (2006.01)

(52) U.S. Cl.
CPC ...... *B60W 30/09* (2013.01); *B60W 30/18163* (2013.01); *B60W 10/20* (2013.01); *B60W 30/143* (2013.01); *B60W 2420/52* (2013.01); *B60W 2550/10* (2013.01); *B60W 2550/308* (2013.01)

(58) Field of Classification Search
CPC .............. G08G 1/167; B60W 30/0953; B60W 30/0956; B60W 30/18163; B60W 30/12; B60W 10/20

USPC ................ 701/23; 702/149–151; 348/149
See application file for complete search history.

(56) References Cited

U.S. PATENT DOCUMENTS

| | | | |
|---|---|---|---|
| 10,046,716 B2* | 8/2018 | Okuda | B60W 30/143 |
| 2005/0270145 A1 | 12/2005 | Kataoka et al. | |
| 2006/0025918 A1 | 2/2006 | Saeki | |
| 2012/0296522 A1* | 11/2012 | Otuka | G08G 1/167 |
| | | | 701/41 |
| 2016/0039358 A1* | 2/2016 | Okuda | B60W 30/143 |
| | | | 348/148 |
| 2016/0311464 A1 | 10/2016 | Yamaoka | |

FOREIGN PATENT DOCUMENTS

| | | |
|---|---|---|
| JP | 2005-138647 A | 6/2005 |
| JP | 2006-315491 A | 11/2006 |
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2009-274594 A | 11/2009 |
| JP | 2010-006279 A | 1/2010 |

(Continued)

*Primary Examiner* — Cuong H Nguyen
(74) *Attorney, Agent, or Firm* — Sughrue Mion, PLLC

(57) ABSTRACT

A lane changing support apparatus includes a plurality of radar sensors and a driving support ECU. The driving support ECU determines whether or not a target object is highly likely to have entered a blind spot area of the radar sensors based on fusion target object information, when starting an extrapolation process of the fusion target object. When the driving support ECU determines that the fusion target object is highly likely to have entered the blind spot, the driving support ECU prohibits the lane changing support control to a lane in the side of this blind spot area.

9 Claims, 18 Drawing Sheets

(56) References Cited

FOREIGN PATENT DOCUMENTS

| JP | 4929777 B2 | 5/2012 |
| JP | 2014-148293 A | 8/2014 |
| JP | 2016-207060 A | 12/2016 |
| JP | 2017-074823 A | 7/2017 |

* cited by examiner

LANE CHANGING SUPPORT APPARATUS

BACKGROUND OF THE INVENTION

1. Field of the Invention

The present invention relates to a lane changing support apparatus (lane change assist device) with a function for supporting/assisting a traveling of an own car for changing lanes from a lane (referred to as an "own lane") in which the own vehicle is traveling to a target lane (referred to as an "adjacent target lane") adjacent to the own lane.

2. Description of the Related Art

A lane changing support/assist apparatus, which has been conventionally known, supports/assists a steering operation (a steering wheel operation) for changing lanes (for example, refer to Japanese Patent Application Laid-Open No. 2009-274594). One of the lane changing support apparatuses (hereinafter, a "conventional apparatus") detects a three-dimensional object (for example, a vehicle other than an own vehicle) present around the own vehicle using a plurality of radar sensors (for example, millimeter wave radars or laser radars) provided to the own vehicle, and acquires information (hereinafter, also referred to as "target object information") including "a longitudinal position, a lateral position, and a relative speed" of the three-dimensional object with respect to the own vehicle, and "a width and a length" of the three-dimensional object.

The conventional apparatus monitors whether or not the own vehicle is able to safely change lanes based on the acquired target object information, and performs a lane changing support when the apparatus determines that the own vehicle can safely change lanes.

As is well known, the radar sensor transmits a radar wave around the radar sensor, receives a reflected wave generated through reflection of the transmitted radar wave by the three-dimensional object, recognizes a target object based on the reflected wave which the radar sensor has received, and acquires position-and-speed information for specifying a position and a speed of the recognized target object with respect to the own vehicle. Hereinafter, the target object recognized by the radar sensor is referred to as a "sensor target object".

Further, a target object (hereinafter, a "determinative target object") considered to indicate one (a single) three-dimensional object is specified based on the sensor target objects.

Meanwhile, a case may occur where the determinative target object cannot be specified when none of the sensor target objects which is highly likely to correspond to the three-dimensional object is detected temporarily. In that case, the determinative target object may continue to be recognized through executing an extrapolation process to estimate the determinative target object corresponding to the three-dimensional object. Further, when the extrapolation process has been executed for a maximum extrapolation duration, the determinative target object is determined to have been lost (that is, it is determined that the determinative target object has disappeared or has become unrecognizable).

Any of a plurality of the radar sensors do not detect any of the sensor target objects that are highly likely to correspond to the three-dimensional object (for example, a vehicle other than the own vehicle) having a low relative speed with respect to the own vehicle, when that three-dimensional object has temporarily entered blind spot areas in the vicinity of the own vehicle where the radar waves are not radiated from any of the radar sensors.

Therefore, when that case happens, the conventional apparatus executes the extrapolation process for the determinative target object corresponding to the three-dimensional object to thereby continue recognizing the determinative target object.

However, a case may arise where the three-dimensional object stays in the blind spot areas for a long period of time equal to or longer than the maximum extrapolation duration, when the relative speed of the three-dimensional object to the own vehicle is low. In this case, despite that the three-dimensional object is present in the blind spot areas, there is a possibility that the conventional apparatus determines that the determinative target object corresponding to that three-dimensional is no longer present in the blind spot areas.

As a result, a case may arise where the lane changing support control is performed even when the three-dimensional object is present in the blind spot areas in the vicinity of the own vehicle, which may be an obstacle to the lane change.

SUMMARY OF THE INVENTION

The present invention has been made in order to solve the above-described problem. That is, one of objects of the present invention is to provide a lane changing suppose apparatus capable of accurately determining whether or not a three-dimensional object is present in the "blind spot areas of radar sensors" in the vicinity of the own vehicle, to thereby be able to reduce a "possibility of performing the lane changing support control in a situation where the three-dimensional object which is an obstacle to the lane change is highly likely to be present in the blind spot areas". Hereinafter, the lane changing support apparatus according to the present invention is also referred to as the "present invention apparatus".

The present apparatus comprises a plurality of radar sensors (16FC, 16FL, 16FR, 16RL, 16RL, and 16RR), target object specifying means (10), and control execution means (10).

The radar sensors, each of which transmits radar wave to surroundings of an own vehicle to detect a reflection point of a three-dimensional object of the radar wave as a sensor target object, and detects position-and-speed information to specify a position (Xobj, Yobj) and a speed (Vxobj, Vyobj) of the detected sensor target object with respect to the own vehicle The target object specifying means for specifying, every time a predetermined time elapses, a determinative target object indicative of a three-dimensional object present around the own vehicle using the position-and-speed information (refer to step 1215, step 1325, and step 1515).

The control execution means for performing a lane changing support control to control a steering angle of the own vehicle so as to support a traveling of the own vehicle when the vehicle changes lanes from an own lane in which the own vehicle is traveling to a target adjacent lane adjacent to the own lane (refer to step 1840).

As shown in FIG. 10, a "three-dimensional object 150 having a low relative speed with respect to at the own vehicle SV" which has been recognized for a certain period or longer as a determinative target object (target object for determination) may continue traveling at this low speed after entering the left blind spot area RdL or the right blind spot area Rdr of the radar sensors. In this case, the three-dimensional object 150 may stay for a long time in the left blind spot area RdL or the right blind spot area Rdr which the three-dimensional object 150 has entered.

In this case, the three-dimensional object 150 enters the blind spot area, as a result, the sensor target corresponding to the three-dimensional target object is not detected. Therefore, the target object specifying means starts an extrapolation of the fusion target object. Thereafter, if the three-dimensional object 150 continues being present in the blind spot area Rd so that the sensor target object which can be fused/integrated to the estimated target sensor object is not detected, the target object specifying means continues the extrapolation of the determinative target object.

Further, when a case continues for the maximum extrapolation duration tg or more where the three-dimensional object 150 continues being present in the blind spot area Rd, despite that the three-dimensional object 150 is present in the blind spot area Rd, it is determined that the determinative target object corresponding to the three-dimensional object 150 has been lost. In this case, when the lane changing support control request is generated, despite that the three-dimensional object 150 which is an obstacle to the lane changing support is present in the blind spot area of the radar sensors, the lane changing support control may unfavorably be performed.

Therefore, the control prohibiting means is configured: for, in a case where the sensor target object corresponding to a previous determinative target object which is the determinative target object specified the predetermined time before is not detected (refer to a "No" determination at step 1410), determining that it is highly likely that an attention determinative target object has entered a blind spot area (RdL, Rdr) in which any of the radar sensors cannot detect any of the sensor target objects (refer to step 1427 and step 1429) to prohibit the control execution means from performing the lane changing support control (refer to a "No" determination at step 1820 and a "No" determination at step 1835), when a blind spot area entering determination condition is satisfied (refer to a "Yes" determination at step 1426 and a "Yes" determination at step 1429), the blind spot area entering determination condition including a first condition and a second condition, the first condition being a condition satisfied when a magnitude of a speed (Vxf) relative to the own vehicle of the attention determinative target object being the previous determinative target object to which the target object which is not detected corresponds is smaller than a threshold relative speed, and the second condition being a condition satisfied when a position of the attention determinative target object with respect to the own vehicle is within a blind spot area entering determination area (DL1 or DR1) which includes a whole of a blind spot area.

According to the above aspect, while the three-dimensional object corresponding to the determinative target object stays in the blind spot area, the lane changing support control to the lane on/in the side of this blind spot area can be prohibited.

In one of aspects of the present invention apparatus, the target object specifying means is configured to acquire a reliability of the determinative target object, in such a manner that the reliability becomes larger as a time for which the determinative target object is continuously specified becomes longer; and the control prohibiting means is configured to determine that the blind spot area entering determination condition is satisfied, when a condition that the reliability of the attention determinative target object is equal to or larger than a first threshold reliability is further satisfied (refer to a "Yes" determination at step 1426 and a "Yes" determination at step 1428).

The present invention apparatus according to the above aspect can more accurately determine that the attention determinative target object is "the three-dimensional object which enters the blind spot area and which is highly likely to stay in the blind spot area for a long time".

In one of aspects of the present invention apparatus, the control prohibiting means is configured to determine that it is highly likely that the attention determinative target object has come out of the blind spot area (refer to a "Yes" determination at step 1615 and a "Yes" determination at step 1715) to permit the control execution means to perform the lane changing support control (refer to step 1620 and step 1720), when a blind spot area leaving determination condition is satisfied in a period for which the lane changing support control is prohibited, the blind spot area leaving determination condition including a condition satisfied when the target specifying means newly specifies the determinative target object and a condition satisfied when a position of the newly specified determinative target object with respect to the own vehicle is within a blind spot area leaving determination area which includes the blind spot area entering determination area.

The present invention apparatus according to the above aspect can reduce a possibility that the lane changing support control to the lane on the blind spot area is prohibited despite that the three-dimensional object corresponding to the attention determinative target object is not actually present in the blind spot area.

In one of aspects of the present invention apparatus, the target object specifying means is configured to acquire a reliability of the determinative target object, in such a manner that the reliability becomes larger as a time for which the determinative target object is continuously specified becomes longer; and the control prohibiting means is configured to determine that the blind spot area leaving determination condition is satisfied, when a condition that the reliability of the newly specified determinative target object is equal to or larger than a second threshold reliability is further satisfied (refer to a "Yes" determination at step 1615 and a "Yes" determination at step 1715).

The present invention apparatus according to the above aspect can more accurately determine that the three-dimensional object corresponding to the attention determinative target object is highly unlikely to be present in the blind spot area.

In one of aspects of the present invention apparatus, the target object specifying means is configured:
  to continuously execute, unless the sensor target object corresponding to the attention determinative target object is detected, based on the position and the speed of the attention determinative target object with respect to the own vehicle, an extrapolation process (refer to step 1435) for specifying an extrapolation determinative target object corresponding to the attention determinative target object until a maximum extrapolation duration elapses; and
  to determine that a three-dimensional object corresponding to the attention determinative target object is lost (refer to step 1455), when the extrapolation process is continuously executed until the maximum extrapolation duration elapses (refer to a "Yes" determination at step 1450);

the control execution means is configured to perform the lane changing support control (refer to step 1840), when determining, based on positions and speeds of the specified determinative target object and the attention determinative target object before being determined to be lost with respect to the own vehicle, that three-dimensional objects represented by the specified determinative target object and attention determinative target object are not obstacles in performing the lane changing support control (refer to a "Yes" determination at step 1820); and the control prohibiting means is configured to prohibit the control execution means from performing the lane changing support control, when the blind spot area leaving determination condition is not satisfied after the blind spot area entering determination condition is satisfied (refer to a "No" determination at step 1615, and a "No" determination at step 1715), even after it is determined that the three-dimensional object corresponding to the attention determinative target object has been lost.

According to the above aspect, while the three-target object corresponding to the attention determinative target object stays in the blind spot area, performing the lane changing support control to the lane on/in the blind spot area can be prohibited even when it is determined that the determinative target object has been lost (has disappeared) owing to the elapse of the maximum extrapolation duration.

In one of aspects of the present invention apparatus, the target object specifying means is configured to calculate a presence probability of the determinative target object (refer to step 1422); and the control prohibiting means is configured to permit the control execution means to perform the lane changing support control in a period for which said control prohibiting means prohibits said control execution means from performing the lane changing support control (refer to step 1620 and step 1720), when another determinative target object, which is different from the attention determinative target object and whose presence probability is equal to or larger than a threshold presence probability, enters a predetermined area within the blind spot leaving determination area (refer to a "Yes" determination at step 1615 and a "Yes" determination at step 1715).

When the other determinative target object having the high presence probability enters a predetermined area within the blind spot area leaving determination area, it can be considered that the attention determinative target object has not been present in the blind spot area. Therefore, according to the above aspect, it is possible to reduce the possibility that the lane changing support control to the lane on the blind spot area is prohibited despite that the three-dimensional target object corresponding to the attention determinative target object is not present in the blind spot area.

In one of aspects of the present invention apparatus, the control prohibiting means is configured to permit the control execution means to perform the lane changing support control (refer to step 1620 and step 1720) in a period for which the control prohibiting means prohibits the control execution means from performing the lane changing support control, when the steering angle is changed through a steering operation of the driver of the own vehicle to override the lane changing support control so that the own vehicle deviates from the own lane (refer to a "Yes" determination at step 1615 and a "Yes" determination at step 1715).

If the three-dimensional object is present in the blind spot area Rd where an extrapolation target fusion target object is determined to be present, the driver will not perform such a steering operation to change lanes to a lane in the side of the blind spot area Rd. Nevertheless, when the lane change to this lane is performed through the steering operation of the driver, it can be determined that there is a high possibility that the three-dimensional object is not present in the blind spot area where an extrapolation target fusion target object is determined to be present. Further, when the lane change to a lane opposite to the lane including the blind spot area where an extrapolation target fusion target object is determined to be present is performed through the steering operation of the driver, it is very difficult for the three-dimensional object present in the blind spot area Rd to continue staying in this blind spot area Rd through following a lateral movement of the own vehicle. Therefore, in this case, it can be determined that there is a high possibility that the three-dimensional object has not been present in the blind spot area where an extrapolation target fusion target object is determined to be present. Therefore, according to the above aspect, it is possible to reduce the possibility that the lane changing support control to the lane on the blind spot area where an extrapolation target fusion target object is determined to be present is prohibited despite that the three-dimensional target object corresponding to the attention determinative target object is not present in the blind spot area.

In one of aspects of the present invention apparatus, the control prohibiting means is configured to permit the control execution means to perform the lane changing support control in a period for which the control prohibiting means prohibits the control execution means from performing the lane changing support control, when the speed of the own vehicle becomes smaller a threshold speed.

When the own vehicle travels at a low speed, the possibility that the determinative target object travels at an approximately equal speed to the speed of the own vehicle is low. Therefore, according to the above aspect, it is possible to reduce the possibility that the lane changing support control to the lane on the blind spot area where an extrapolation target fusion target object is determined to be present is prohibited despite that the three-dimensional target object corresponding to the attention determinative target object is not present in the blind spot area.

In one of aspects of the present invention apparatus, the control prohibiting means is configured to permit the control execution means to perform the lane changing support control, when an elapsed time from at a time point when the control prohibiting means prohibits the control execution means from performing the lane changing support control becomes longer than a threshold time.

When the target object determined to have entered the blind spot area cannot be detected for a long time, it can be determined that this target object has not been actually present in the blind spot area. Therefore, according to the above aspect, it is possible to reduce the possibility that the lane changing support control to the lane on the side of the blind spot area is prohibited despite that the three-dimensional target object corresponding to the attention determinative target object is not present in the blind spot area.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

A lane changing support apparatus (a lane change assist device) according to each of embodiments of the present invention will be described below, referring to drawings.

First Embodiment

<Construction>

Figure 1:
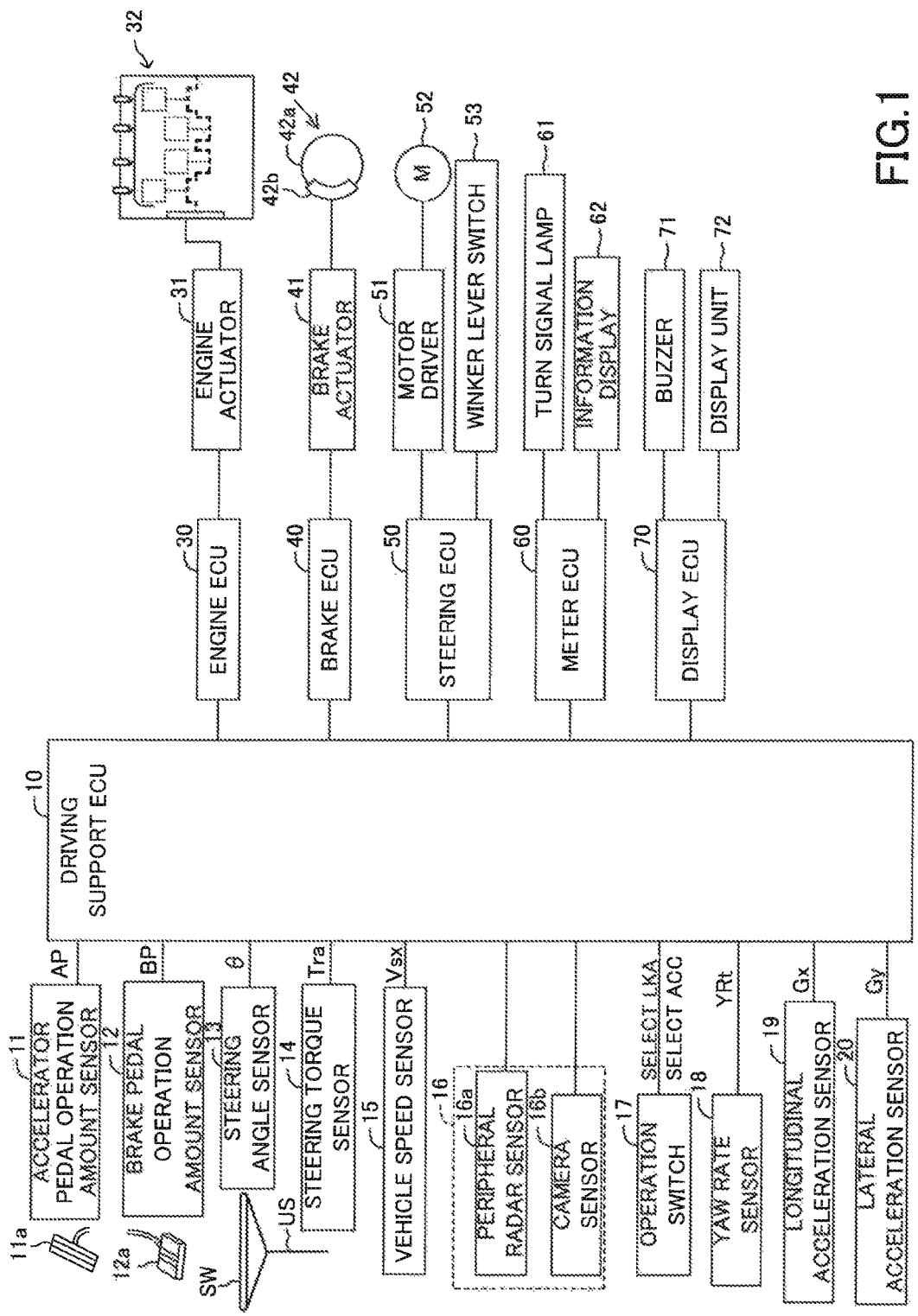
FIG. 1 is a schematic configuration diagram for illustrating a lane changing support apparatus according to an embodiment of the present invention.

As shown in FIG. 1, the lane change support apparatus according to a first embodiment (hereinafter, also referred to as a "first apparatus") is applied to a vehicle (hereinafter referred to as an "own vehicle" to distinguish the vehicle from other vehicles). The present apparatus includes a driving support ECU 10, an engine ECU 30, a brake ECU 40, a steering ECU 50, a meter ECU 60, and a display ECU 70. It should be noted that the driving support ECU 10 is simply referred to (expressed) as a "DSECU", in the following description.

Each of those ECUs is an electronic control unit comprising a microcomputer as a main part. The ECUs are connected with each other via a CAN (Controller Area Network) which is not illustrated so that they are capable of mutually transmitting and receiving information. In the present specification, the microcomputer includes a CPU, a ROM, a RAM, a non-volatile memory, an interface I/F, and the like. The CPU is configured to realize various functions by executing instructions (programs, routines) stored in the ROM. Some or all of these ECUs may be integrated into a single ECU.

The DSECU is connected to sensors (including switches) described below, and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU connected to that sensor.

The sensors are as follows:

An accelerator pedal operation amount sensor 11 for detecting an operation amount of an accelerator pedal 11a.

A brake pedal operation amount sensor 12 for detecting an operation amount of a brake pedal 12a.

A steering angle sensor 13 for detecting a steering angle θ of a steering wheel SW.

A steering torque sensor 14 for detecting a steering torque Tra applied to a steering shaft US of the own vehicle through an operation of the steering wheel SW.

A vehicle speed sensor 15 for detecting a traveling speed (vehicle speed) of the own vehicle to output a speed Vsx which is a speed in a longitudinal direction of the own vehicle (that is, a longitudinal speed).

Peripheral sensors 16 including peripheral radar sensors 16a and a camera sensor 16b.

An operation switch 17.

A yaw rate sensor 18 for detecting a yaw rate YRt of the own vehicle SV.

A longitudinal acceleration sensor 19 for detecting a longitudinal acceleration Gx of the own vehicle SV.

A lateral acceleration sensor 20 for detecting an acceleration Gy in a lateral direction (vehicle width direction) of the own vehicle SV (Gy in an orthogonal direction to a center axis line of the own vehicle SV).

Figure 2:
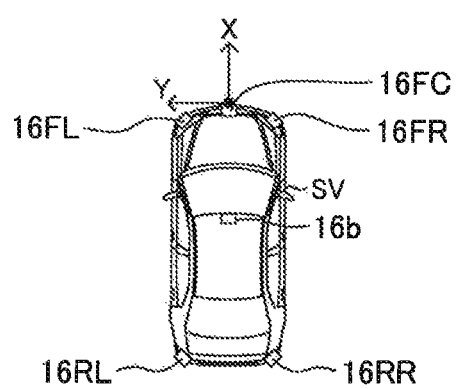
FIG. 2 is a plan view of an own vehicle for illustrating an arrangement position of peripheral radar sensors shown in FIG. 1.

As shown in FIG. 2, the peripheral radar sensors 16a include a central front peripheral sensor 16FC, a right front peripheral sensor 16FR, a left front peripheral sensor 16FL, a right rear peripheral sensor 16RR, and a left rear peripheral sensor 16RL. The peripheral radar sensors 16a may be simply referred to as "radar sensors" in some cases.

When there is no need to individually distinguish the peripheral sensors 16FC, 16FR, 16FL, 16RR, and 16RL from each other, each of them is referred to as the peripheral radar sensor 16a, and they are referred to as the peripheral radar sensors 16a. The peripheral sensors 16FC, 16FR, 16FL, 16RR, and 16RL have substantially the same configuration as each other.

The peripheral radar sensor 16a includes a radar transmitting/receiving section (not shown) and a signal processing section (not shown). The radar transmitting/receiving section radiates a radar wave (hereinafter also referred to as a "millimeter wave") which is an electric wave in a millimeter waveband, and receives the millimeter wave (that is, a reflected wave) reflected from a three-dimensional object (for example, a vehicle other than the own vehicle, a pedestrian, a bicycle, a building, and the like) present in a radiation area of the millimeter wave. The point of the three-dimensional object which reflects the radar wave (millimeter wave) is also referred to as a "reflection point".

The signal processing section acquires (detects), every time a predetermined time elapses, reflection point information (position-and-speed information) indicative of a distance between the own vehicle SV and the reflection point of the three-dimensional object, a relative speed between the own vehicle SV and the reflection point of the three-dimensional object, and a direction of the reflection point of the three-dimensional object relative to the own vehicle SV, based on, for example, a phase difference between the transmitted millimeter wave and the received reflected wave, a frequency difference between them, an attenuation level of the reflected wave, and a time (period) from when the millimeter wave is transmitted to a time point when the reflected wave is received. The reflection point of the three-dimensional object is regarded as a target object and is also referred to as the "sensor target object".

The center front peripheral sensor 16FC is provided/disposed at a front central portion of a vehicle body and detects the sensor target object present in a front area of the own vehicle SV. The right front peripheral sensor 16FR is provided at a right front portion of the vehicle body and mainly detects the sensor target object present in a right front area of the own vehicle SV. The left front peripheral sensor 16FL is provided at a left front portion of the vehicle body and mainly detects the sensor target object present in a left front area of the own vehicle SV. The right rear peripheral sensor 16RR is provided at a right rear portion of the vehicle body and mainly detects the sensor target object present in a right rear area of the own vehicle SV. The left rear peripheral sensor 16RR is provided at a left rear portion of the vehicle body and mainly detects the sensor target object present in a left rear area of the own vehicle SV. For example, the peripheral radar sensor 16a detects the sensor target object located within a range of about 100 meters from the own vehicle SV. It should be noted that the peripheral radar sensor 16a may be the radar sensor using the electric wave (radar wave) in a frequency band other than the millimeter wave band.

As shown in FIG. 2, the DSECU defines X-Y coordinates. An X axis is a coordinate axis which extends along the longitudinal direction of the own vehicle SV so as to pass through a central position in a width direction of a front-end portion of the own vehicle SV. The X axis defines a positive coordinate value for a position in a front direction of the own the vehicle. A Y axis is a coordinate axis which is orthogonal to the X axis. The Y axis defines a positive coordinate value for a position in a left direction of the own the vehicle. Each of an origin of the X axis and an origin of the Y axis is at the center position of the front-end portion of the own vehicle SV in the width direction.

The peripheral radar sensor 16a transmits, every time a predetermined time (calculation period) elapses, "information on the sensor target object" described below to the DSECU based on the reflection point information (position-and-speed information) described above. Hereinafter, the "information on the sensor target object" is referred to as "sensor target object information". It should be noted that the DSECU may acquire the above-described reflection point information (position-and-speed information) directly from the peripheral radar sensor 16a and then acquire the sensor target information by calculating the sensor target information based on the reflection point information, every time a calculation period elapses.

The sensor target object information includes information described below.

An X coordinate position (Xobj) of the sensor target object. That is, a distance (having a sign of plus or minus) in an X axis direction between the own vehicle SV and the sensor target object. The X coordinate position Xobj is also referred to as a "longitudinal distance Xobj" or a "longitudinal position Xobj".

A Y coordinate position (Yobj) of the sensor target object. That is, a distance (having a sign of plus or minus) in a Y axis direction between the own vehicle SV and the sensor target object. The Y coordinate position Yobj is also referred to as a "lateral position Yobj".

A speed Vxobj of the sensor target object in the X axis direction with respect to the own vehicle SV (that is, the speed Vxobj is a longitudinal relative speed Vxobj). It should be noted that a longitudinal absolute speed Vaxobj is a value obtained by adding the vehicle speed V of the own vehicle SV to the longitudinal relative speed Vxobj.

A speed Vyobj of the sensor target object in the Y axis direction with respect to the own vehicle SV (that is, the speed Vyobj is a lateral relative speed Vyobj). It should be noted that a lateral absolute speed Vayobj is set to a value equal to the lateral relative speed Vyobj.

A "sensor target object identification information (sensor target object ID)" for identifying (specifying) the sensor target object.

A case may arise where one (a single) three-dimensional object has two or more of the reflection points. In that case, each of the peripheral radar sensors 16a may detect a plurality of sensor target objects for/from one three-dimensional object. That is, each of the peripheral radar sensors 16a may acquire a plurality of sets of the sensor target object information. Further, a case may arise where the two or more of the peripheral radar sensors 16a acquire the sets of the sensor target object information for a single three-dimensional object.

In view of the above, the DSECU performs grouping (integrating, fusing) of the sensor target objects that are highly likely to correspond to (or to be obtained by detection of) one (a single) three-dimensional object to thereby recognize (specifies) one target object (that is called a fusion target object) identified/represented by a plurality of the sensor target objects, as the "determinative target object" indicative of the three-dimensional object around (in the surroundings of) the own vehicle SV.

Further, the DSECU acquires/obtains "attribute values of the fusion target object (information on the attribute values)", as described later. The Information on the attribute values of the fusion target object is referred to as "fusion target object information" or "fusion target object attribute values", and includes information (values) described below.

An X coordinate position (Xf) of the fusion target object. That is, a distance (having a sign of plus or minus) in the X axis direction between the own vehicle SV and the fusion target object.

In this example, the X coordinate position Xf is an X coordinate position of the center point of the fusion target object.

A Y coordinate position (Yf) of the fusion target object. That is, a distance (having a sign of plus or minus) in the Y axis direction between the own vehicle SV and the fusion target object.

In this example, the Y coordinate position Yf is a Y coordinate position of the center point of the fusion target object.

A speed Vxf of the fusion target object in the X axis direction with respect to the own vehicle SV. That is, the speed Vxf is a longitudinal relative speed Vxf.

A speed Vyf of the fusion target object in the Y axis direction with respect to the own vehicle SV. That is, the speed Vyf is a lateral relative speed Vyf.

A length Lf of the fusion target object (length of the fusion target in the X axis direction).

A width Wf of the fusion target object (length of the fusion target in the Y axis direction).

A "fusion target object identification information (fusion target object ID)" for identifying (specifying) the fusion target object.

An X coordinate position (Xfs) of the fusion target object at a time point when the fusion target object is newly generated/formed.

A Y coordinate position (Yfs) of the fusion target object at the time point when the fusion target object is newly generated/formed.

An AGE of the fusion target object which will be described later.

A presence probability (possibility) Trst of the fusion target object which will be described later.

The camera sensor 16b includes a camera section which is a stereo camera and a lane recognition section which analyzes an image data taken (through photographing) by the camera section to recognize white lines on a road. The camera sensor 16b (camera section) photographs (takes an image of) a view in the front (ahead) of the own vehicle SV. The camera sensor 16b (lane recognition section) analyzes the image data in an image processing area having a predetermined angular range (range expanding in forward direction of the own vehicle SV) and recognizes (detects) the white lines (lane markers) formed on the road in front (ahead) of the own vehicle SV. The camera sensor 16b transmits information on the white lines which has been recognized to the DSECU.

Figure 3:
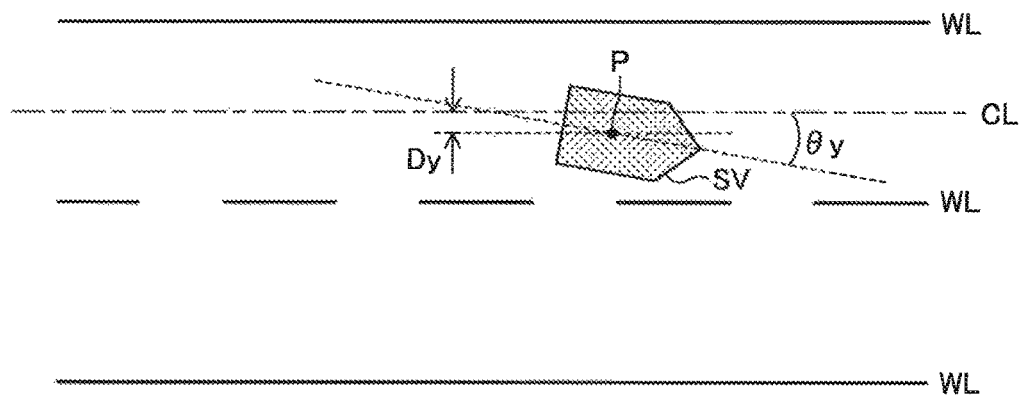
FIG. 3 is a plan view for illustrating the own vehicle and a road for explaining a lane keeping control.

As shown in FIG. 3, the DSECU specifies, based on the information supplied from the camera sensor 16b, a lane center line CL which is positioned at a center position in a width direction of the left and right white lines WL in a lane in which the own vehicle SV is traveling. Hereinafter, the lane in which the own vehicle SV is traveling is also referred to as an "own lane". The lane center line CL is used as a "target traveling line" in a lane keeping control (lane keeping support control) described later. Further, the DSECU calculates a curvature Cu of a curve of the lane center line CL. It should be noted that the curvature Cu is defined to be a positive value when the lane center line CL curves to the right, and to be a negative value when the lane center line CL curves to the left.

In addition, the DSECU calculates a position of the own vehicle SV in the lane (own lane) defined by the left white line and the right white line and a direction of the own vehicle SV in the lane. For example, as shown in FIG. 3, the DSECU calculates a distance Dy having a sign of plus or minus in a road width direction between a reference point P (for example, a center of gravity position) of the own vehicle SV and the lane center line CL. A magnitude of the "distance Dy having a sign of plus or minus" indicates a distance (length) by which the own vehicle SV is deviated/shifted in the road width direction with respect to (from) the lane center line CL. The distance Dy is defined to be a positive value (whose sign is plus) when the reference point P of the own vehicle SV deviates to the right side in the road width direction with respect to the lane center line CL, and to be a negative value (whose sign is minus) when the reference point P of the own vehicle SV deviates to the left side in the road width direction with respect to the lane center line CL. Hereinafter, the distance Dy having a sign of plus or minus is also referred to as a "lateral deviation Dy".

The DSECU calculates an angle θy formed between a direction of the lane center line CL and a direction (direction of a longitudinal axis of the own vehicle SV) in which the own vehicle C heads. Hereinafter, the angle θy is also referred to as a "yaw angle θy". The yaw angle θy is defined to be a positive value when the direction of the own vehicle SV inclines in the clockwise direction with respect to the direction of the lane center line CL, and to be a negative value when the direction of the own vehicle SV inclines in the counterclockwise direction with respect to the direction of the lane center line CL. Hereinafter, the information (Cu, Dy, θy) indicative of the curvature Cu, the lateral deviation Dy, and the yaw angle θy may sometimes be referred to as "lane-related vehicle information".

The camera sensor 16b supplies information about/on types of the left and right white lines on the own lane (for example, whether it is a solid line or a broken line), a shape of each of those lines, and the like to the DSECU. Further, the camera sensor 16b also supplies information about/on types of the left and right white lines on a lane adjacent to the own lane, and a shape of each of those lines, and the like to the DSECU. That is, the camera sensor 16b transmits the "information on the white lines" to the DSECU. When the white line is the solid line, the vehicle is prohibited from changing lanes through crossing the white line (the solid line). In contrast, when the white line is the broken line (white line segments intermittently formed at constant intervals), the vehicle is permitted to change lanes through crossing the white line (the broken line). The lane-related vehicle information (Cu, Dy, θy) and the information on the white lines may sometimes be referred to as "lane information".

The operation switch 17 is an operation device operated by the driver. The driver operates the operation switch 17 in order to select whether or not to perform each of "a lane changing support control, a lane keeping control, and a following-travel inter-vehicle-distance control", that will be described later. Thus, according to the operation of the driver, the operation switch 17 outputs/generates a signal indicative of whether or not each of the above-described controls has been selected to be performed. In addition, the operation switch 17 also has a function of allowing the driver to input or select parameters reflecting the driver's preference when the DSECU performs each of the above-described controls.

The engine ECU 30 is connected to an engine actuator 31. The engine actuator 31 includes a throttle valve actuator for changing an opening degree of a throttle valve for adjusting an intake air amount of an internal combustion engine. The engine ECU 30 changes the torque generated by the internal combustion engine 32 by driving the engine actuator 31 so as to control a driving force of the own vehicle SV, to thereby be able to change an acceleration state (acceleration) of the own vehicle SV.

The brake ECU 40 is connected to a brake actuator 41. The brake actuator 41 adjusts, in response to an instruction from the brake ECU 40, a hydraulic pressure to be supplied to a wheel cylinder built in a brake caliper 42b of a friction brake mechanism 42 to press a brake pad onto a brake disk 42a using the hydraulic pressure so as to generate a friction brake force. Therefore, the brake ECU 40 controls the brake actuator 41 so as to control a braking force of the own vehicle SV, to thereby be able to change an acceleration state (deceleration) of the own vehicle SV.

The steering ECU 50 is a control unit of a well-known electric power steering system, and is connected to a motor driver 51. The motor driver 51 is connected to a steering motor 52. The steering motor 52 is incorporated into a "steering mechanism including a steering wheel, a steering shaft coupled to the steering wheel, a gear mechanism for steering, and the like" of the own vehicle. The steering motor 52 generates torque by electric power supplied from the motor driver 51, to thereby be able to add a steering assist torque to the steering mechanism or to steer the left and right steered wheels using the generated torque. That is, the steering motor 52 can change the steering angle of the own vehicle SV (turning angle of the steered wheels).

The steering ECU 50 is connected to a blinker lever switch (that is, a turn signal lever switch) 53. The blinker lever switch 53 is a detection switch for detecting an operation position of a blinker lever operated by the driver in order to activate (blink) a turn signal lamp 61 described later.

The blinker lever is provided on/to the steering column. The blinker lever is configured to be able to be operated/moved to two positions in the clockwise operation direction. One of the two position is a first step position to which the blinker lever is rotated from an initial position by a predetermined angle in the clockwise operation direction. The other of the two position is a second step position to which the blinker lever is rotated further from the first stage position by a predetermined angle in the clockwise operation direction. The blinker lever is configured to maintain its position at the first step position in the clockwise operation direction as long as the driver makes the blinker lever stay at the first step position in the clockwise operation direction. The blinker lever is configured to automatically return to the initial position when the driver releases his/her hand from the blinker lever. The blinker lever switch 53 outputs/generates to the steering ECU 50 a signal indicating that the blinker lever is maintained at the first step position in the clockwise operation direction when the blinker lever is at the first step position in the clockwise operation direction.

The blinker lever is configured to be able to be operated/moved to two positions in the counterclockwise operation direction. One of the two position is a first step position to which the blinker lever is rotated from an initial position by a predetermined angle in the counterclockwise operation direction. The other of the two position is a second step position to which the blinker lever is rotated further from the first stage position by a predetermined angle in the counterclockwise operation direction. The blinker lever is configured to maintain its position at the first step position in the counterclockwise operation direction as long as the driver makes the blinker lever stay at the first step position in the counterclockwise operation direction. The blinker lever is configured to automatically return to the initial position when the driver releases his/her hand from the blinker lever. The blinker lever switch 53 outputs/generates to the steering ECU 50 a signal indicating that the blinker lever is maintained at the first step position in the counterclockwise operation direction when the blinker lever is at the first step position in the counterclockwise operation direction. It should be noted that such a blinker lever is disclosed in, for example, Japanese Patent Application Laid-Open No. 2005-138647.

The DSECU measures a duration time for which the blinker lever is held at the first step position in the clockwise operation direction based on a signal transmitted from the blinker lever switch 53. Further, when the DSECU determines that the measured duration time is equal to or longer than a support request determination time (for example, 0.8 seconds) which has been set in advance, the DSECU is configured to determine that the driver is generating a request representing that the driver wants to receive the lane changing support in order to change lanes from the own lane to the right side lane of the own lane. Hereinafter the request also referred to as a "lane changing support request".

Further, the DSECU measures a duration time for which the blinker lever is held at the first step position in the counterclockwise operation direction based on a signal transmitted from the blinker lever switch 53. Further, when the DSECU determines that the measured duration time is equal to or longer than the support request determination time which has been set in advance, the DSECU is configured to determine that the driver is generating the lane changing support request in order to change lanes of the own vehicle from the own lane to the left side lane of the own lane.

The meter ECU 60 is connected to the left and right turn signal lamps 61 (turn indicator lamps/blinker lamps) and an information display 62.

The meter ECU 60 is configured to blink the left or right turn signal lamps 61 in response to a signal transmitted from the blinker lever switch 53 and an instruction transmitted from the DSECU or the like, through a winker drive circuit (not shown). For example, the meter ECU 60 blinks the left turn signal lamps 61 when the blinker lever switch 53 is outputting a signal indicating that the blinker lever is maintained at the first step position in the counterclockwise operation direction. Further, the meter ECU 60 blinks the right turn signal lamps 61 when the blinker lever switch 53 is outputting a signal indicating that the blinker lever is maintained at the first step position in the clockwise operation direction.

The information display 62 is a multi-information display provided in front of a driver's seat. The information display 62 displays various kinds of information in addition to measured values such as the vehicle speed and an engine rotation speed. For example, when the meter ECU 60 receives a display command corresponding to a driving support state from the DSECU, the meter ECU 60 causes the information display 62 to display a screen designated by the display command.

The display ECU 70 is connected to a buzzer 71 and a display unit 72. In response to the instruction transmitted from the DSECU, the display ECU 70 can cause the buzzer 71 to generate sounds to thereby alert the driver. Further, in response to the instruction transmitted from the DSECU, the display ECU 70 can cause the display unit 72 to light an attention mark (for example, a warning lamp), and/or to display an attention message and an operation situation of a driving support control. It should be noted the display unit 72 is a head-up display in this example, however, the display unit 72 may be another type of the display.

(Outline of Basic Driving Support Control)

As described above, the DSECU is configured to perform the following-travel inter-vehicle-distance control, the lane keeping control, and the lane changing support control. The lane keeping control is performed only when the following-travel inter-vehicle-distance control is being performed. The lane changing support control is performed only when the lane keeping control is being performed.

The following-travel inter-vehicle-distance control is a control for having the own vehicle travel to follow a preceding vehicle (that is, a following target vehicle) which travels in front (ahead) of the own vehicle while maintaining an inter-vehicle distance between the preceding vehicle and the own vehicle SV at a predetermined distance. The following-travel inter-vehicle-distance control is well known (for example, refer to Japanese Patent Application Laid-Open No. 2014-148293, No. 2006-315491, Japanese Patent No. 4172434, and Japanese Patent No. 4929777).

The lane keeping control is a control for applying the steering torque to the steering mechanism to change the steering angle of the own vehicle SV in such a manner that the position of the own vehicle SV is kept in the vicinity of a target traveling line (for example, the center line of the lane (own lane) in which the own vehicle SV travels) within the lane (own lane), so as to support the steering operation of the driver. The lane keeping control is well known (for example, refer to Japanese Patent Application Laid-Open No. 2008-195402, No. 2009-190464, No. 2010-6279 and Japanese Patent No. 4349210).

The lane changing support/assist control is a control for applying the steering torque to the steering mechanism to change the steering angle of the own vehicle SV in such a manner that the own vehicle SV is moved from the own lane (that is, an original lane) to "a lane adjacent to the original lane desired by the driver (that is, a target adjacent lane)", so as to support the steering operation (steering wheel operation for the lane change) of the driver. The lane changing support control is well known (for example, refer to Japanese Patent Application Laid-Open No. 2016-207060, and No. 2017-74823). For example, the lane changing support control is a control for setting "a target lateral position of the own vehicle SV" with reference to the center line of the original lane as a function of time t from a time point at which the lane changing support control starts in such a manner that the own vehicle SV is moved in the width direction of the road from the original lane to the target adjacent lane in a predetermined time (period), and for changing the steering angle of the own vehicle SV so as to have a lateral position of the own vehicle SV coincide with the target lateral position.

(Outline of Acquiring Fusion Target Object Information)

The DSECU determines whether or not the own vehicle SV can safely change lanes before performing the lane changing support control.

For example, the DSECU determines whether or not permission condition of the lane changing support control is satisfied, when the lane changing support request is generated while the lane keeping control is performed and the execution of the lane changing support control is selected. That is, the DSECU determines whether or not the three-dimensional object is present in the target adjacent lane. Further, when the three-dimensional object is present in the target adjacent lane, the DSECU determines whether or not a position of the three-dimensional object is a safe position to the own vehicle SV when the own vehicle SV change lanes. In order to make such a determination, the DSECU acquires a relative position (for example, the center position of the three-dimensional object), a relative longitudinal speed, and a relative lateral speed accurately, with respect to the own vehicle SV, in addition to these, the DSECU needs to acquire the shortest distance between end portion (the end portion in the width direction and the end portion in the length direction) of the three-dimensional object and the own vehicle SV accurately. In order to acquire this shortest distance, the DSECU needs to acquire the width and length of the three-dimensional object.

In view of the above, the DSECU is configured to generate/form the above-described "fusion target object" to recognize the three-dimensional object present around the own vehicle SV and to acquire the above-described "fusion target object information (for example, "the length, the width, and the coordinate position" of the fusion target object)" as information of/on the three-dimensional object, using the formed fusion target object.

Hereinafter, the outline of the operation of the first apparatus when the first apparatus acquires the fusion target object information will be described. It should be noted that the method of generating/forming and updating the fusion target object will be described much later.

The DSECU generates or updates the fusion target object by/through grouping (integrating) the sensor target objects detected by the peripheral radar sensor 16a according to grouping processes (processes for grouping) which will be described later, every time a predetermined calculation period ($\Delta t$) elapses. Further, the DSECU generates the fusion target object information of the fusion target object generated or updated based on the sensor target object information of the sensor target objects (that is, grouped sensor target objects) belonging to the fusion target object.

Meanwhile, all of the sensor target objects do not always have the accurate sensor target object information. That is, the accuracy of the sensor target object information degrades, for example, when the sensor target object is a target object (so-called a ghost target object) erroneously detected by the peripheral radar sensor 16a, and/or when the sensor target object information is erroneous information due to influence of noise.

In view of the above, the DSECU (or the peripheral radar sensor 16a) calculates/acquires "information indicative of a length of a period during which the sensor target object is continuously detected", which is referred to as an "AGE", for the sensor target object. More specifically, the DSECU sets a value of the "AGE" of the sensor target object which is detected for the first time to "0". Thereafter, every time one calculation period $\Delta t$ elapses, when a sensor target object is detected and the detected sensor target object is the same as (is identical to) the sensor target object which was detected at the time point of the previous calculation time point, the DSECU increments (+1) the value of "AGE" for that sensor target object. In other words, the DSECU increments (+1) the value of "AGE" for a detected sensor target having the same identification information as the sensor target object which was detected at the time point of the previous calculation time point. When the sensor target object is the ghost target object or is detected due to the noise, the detected sensor target object has a low possibility of continuing to be detected (is unlikely to continue being detected) as the same target object for a long time. Therefore, the AGE for that detected sensor target object is unlikely to become large.

Further, the DSECU recognizes/identifies the sensor target object whose value of "AGE" is equal to or larger than a predetermined threshold as a "high AGE sensor target object". In other words, the DSECU recognizes the sensor target object which has been continuously detected for a time equal to or longer than the threshold time as the high AGE sensor target object. The DSECU recognizes/identifies the sensor target object whose value of "AGE" is smaller than the predetermined threshold as a "low AGE sensor target object".

Thereafter, the DSECU calculates at least the length Lf (hereinafter, also referred to as a "target object length Lf") of the fusion target object, the width Wf (hereinafter, also referred to as a "target object width Wf") of the fusion target object, and the position (Xf, Yf) of the fusion target object, all of which is included in the fusion target object information, using the "high AGE sensor target object" among the sensor target objects belonging to the fusion target object.

More specifically, the DSECU calculates a magnitude (=|Xmaxh−Xminh|) of a difference between a maximum longitudinal position Xmaxh and a minimum longitudinal position Xminh, as the fusion target object length Lf. The maximum longitudinal position Xmaxh is the "maximum/largest value in/among the X coordinate positions Xobj of the high AGE target objects belonging to the fusion target object". The minimum longitudinal position Xminh is the "minimum/smallest value in/among the X coordinate positions Xobj of the high AGE target objects belonging to the fusion target object".

Similarly, the DSECU calculate a magnitude (=|Ymaxh−Yminh|) of a difference between a maximum lateral position Ymaxh and a minimum lateral position Yminh, as the width Wf of the fusion target object. The maximum lateral position Ymaxh is the "maximum/largest value in/among the Y coordinate positions Yobj of the high AGE target objects belonging to the fusion target object". The minimum lateral position Yminh is the "minimum/smallest value in/among the Y coordinate positions Yobj of the high AGE target objects belonging to the fusion target object". Note that the DSECU may select more accurately detected high AGE sensor target among the high AGE sensor targets belonging to the fusion target object so as to calculate the width Wf of the fusion target object using the selected high AGE sensor target object.

It should be noted that the DSECU calculates an average value of the longitudinal relative speeds Vxf of the high AGE sensor target objects belonging to the fusion target object to acquire/obtain the longitudinal relative speed of the fusion target. Similarly, the DSECU calculates an average value of the lateral relative speeds Vyf of the high AGE sensor target objects belonging to the fusion target object to acquire/obtain the lateral relative speed of the fusion target.

(Generating/Updating Fusion Target Object, and Lost Determination)

Next, a method of generating/updating the fusion target object, and a method of lost determination, performed by the DSECU, will be described.

The DSECU acquires the sensor target object information from the peripheral radar sensors 16a, every time a predetermined time Δt (calculation period) elapses. A target object detection range of any specific one of the peripheral radar sensors 16a partially overlaps with a target object detection range of one of the peripheral radar sensors 16a other than the specific one. Further, even when only one three-dimensional object is present around the own vehicle SV, each of the peripheral radar sensors 16a may recognize/detects a plurality of the sensor target objects from that single three-dimensional object in some cases. For the reasons described above, a case sometimes occurs where plurality of the sensor target objects are acquired from one (single) three-dimensional object.

In this case, the DSECU performs grouping processes (or processes for grouping) described later to group (integrate, fuse) "the sensor target objects that are highly likely to be obtained from one three-dimensional object n", to thereby generate/form the fusion target object FBn corresponding to that one three-dimensional object n. In other words, the DSECU integrates the sensor target objects based on the respective sensor target object information of the sensor target objects to generate the fusion target object FBn. Thereafter, the DSECU generates/acquires the fusion target object information of the fusion target object FBn based on the sensor target object information of the high AGE sensor target objects among (selected from) the sensor target objects that are integrated into the fusion target object FBn (that is, that belong to the fusion target object FBn). Hereinafter, the "grouping processes" will be described in detail, using the examples shown in FIGS. 4A and 4B.

Figure 4A:
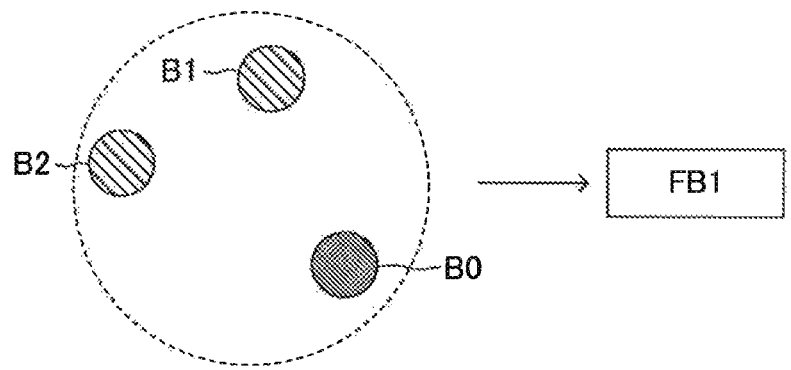
FIG. 4A is a diagram for explaining a grouping processes for integrating sensor target objects.

As shown in FIG. 4A, it is assumed that sensor target objects B0, B1 and B2 are detected. In this example, the sensor target object B0 has been detected by the right front peripheral sensor 16FR, and both of the sensor target object B1 and the sensor target object B2 have been detected by the central front peripheral sensor 16FC. Further, in this example, a fusion target object has not been generated/formed yet up to the present time point (in other words, a fusion target object had not been generated at the time point of the previous calculation which is a calculation performed the calculation time period Δt before).

When the fusion target object FBn has not been generated at a time point of starting the present calculation as in the example shown in FIG. 4A, the DSECU carries out the grouping processes for generating/forming a new fusion target object FBn as described below. It should be noted that this grouping processes are referred to as "new target object generation grouping processes".

Firstly, the DSECU selects an arbitrary sensor target object (for example, the sensor target object B0) as a grouping reference target object Bs from a plurality of the sensor target objects (for example, the sensor target objects B0 to B2). Next, the DSECU determines whether or not the "sensor target object(s) Bn (for example, the sensor target object(s) Bn, n=1, 2) other than the grouping reference target object Bs" serving as a grouping candidate satisfies both of the following conditions (condition G1 and condition G2) with respect to the grouping reference target object Bs (for example, the sensor target object B0). When the sensor target object Bn of the grouping candidate satisfies both of the following conditions (condition G1 and condition G2), it is determined that the sensor target object Bn satisfies grouping conditions.

The Condition G1: Condition using positions as criterions for determination.

Figure 4B:
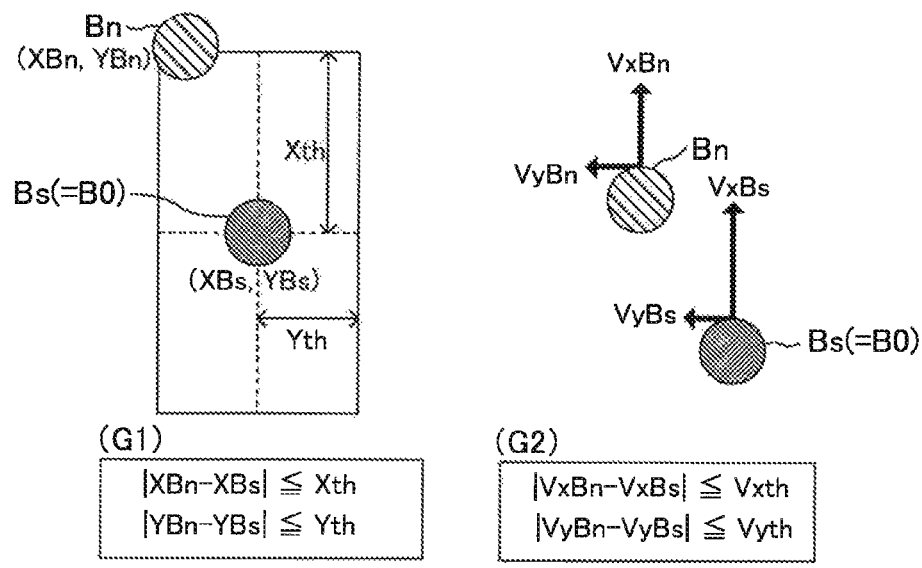
FIG. 4B is a diagram for explaining the grouping processes for integrating the sensor target objects.

The condition G1 is a condition satisfied when, as shown in the left side of FIG. 4B, an absolute value of a difference (=|XBn−XBs|) between "the X coordinate position Xobj (=XBn) of the sensor target object Bn which is the grouping candidate" and "the X coordinate position Xobj (=XBs) of the grouping reference target object Bs" is equal to or smaller than a predetermined threshold longitudinal distance Xth, and an absolute value of a difference (=|YBn−YBs|) between "the Y coordinate position Yobj (=YBn) of the sensor target object Bn which is the grouping candidate" and "the Y coordinate position Yobj (=YBs) of the grouping reference target object Bs" is equal to or smaller than a predetermined threshold lateral distance Yth.

Here, the threshold longitudinal distance Xth is equal to a value of "a target object length L0×0.5+a predetermined value α" (that is, Xth=L0×0.5+α).

The threshold lateral distance Yth is equal to a value of "a target object width W0×0.5+a predetermined value β" (that is, Yth=W0×0.5+β).

An arbitrary fixed values suitable for the condition G1 are used for the target object length L0 and the target object width W0. For example, a standard length of a motorcycle is used as the target object length L0, and a standard width of the motorcycle is used as the target object width W0.

The Condition G2: Condition using speeds as criterions for determination.

The condition G2 is a condition satisfied when, as shown in the right side of FIG. 4B, an absolute value of a difference (=|VxBn−VxBs|) between "the longitudinal relative speed Vxobj (=VxBn) of the sensor target object Bn which is the grouping candidate" and "the longitudinal relative speed Vxobj (=VxBs) of the grouping reference target object Bs" is equal to or smaller than a predetermined longitudinal relative speed difference threshold Vxth, and an absolute value of a difference (=|VyBn−VyBs|) between "the lateral relative speed Vyobj (=VyBn) of the sensor target object Bn which is the grouping candidate" and "the lateral relative speed Vyobj (=VyBs) of the grouping reference target object Bs" is equal to or smaller than a predetermined lateral relative speed difference threshold Vyth.

It should be noted that the DSECU may determine whether or not the condition G2 is satisfied, using the absolute speeds. That is, the condition G2 may be a condition satisfied when:

an absolute value of a difference between "the longitudinal absolute speed of the sensor target object Bn which is the grouping candidate" and "the longitudinal absolute speed of the grouping reference target object Bs" is equal to or smaller than a predetermined longitudinal speed difference threshold Vxth, and an absolute value of a difference between "the lateral absolute speed of the sensor target object Bn which is the grouping candidate" and "the lateral absolute speed of the grouping reference target object Bs" is equal to or smaller than a predetermined lateral speed difference threshold Vyth.

When the sensor target object Bn serving as a grouping candidate satisfies both of the condition G1 and the condition G2 for (with respect to) the grouping reference target object Bs, the DSECU fuses (integrates/merges) the sensor target object Bn and the grouping reference target object Bs to newly generate/form a fusion target object FBn (that is, specifies the new determinative target object). Further, the DSECU assigns (provides/gives) "identification information (ID) for distinguishing (identifying) that newly formed fusion target object FBn from fusion target object(s) excluding that newly formed fusion target object FBn" to that newly formed fusion target object FBn.

For example, for the example shown in FIG. 4A, it is assumed that the sensor target object B1 serving as the grouping candidate satisfies both the conditions (the condition G1 and the condition G2) for (with respect to) the grouping reference target object B0. In this case, the DSECU newly generates/forms the fusion target object FB1 through fusing/integrating the sensor target object B1 and the sensor target object B0. The identification information of/for the fusion target object FB1 is, for example, "ID1".

Further, in FIG. 4A, when the sensor target object B2 serving as the grouping candidate also satisfies both of the conditions (the condition G1 and the condition G2) for (with respect to) the grouping reference target object B0, the DSECU also fuses/integrates the sensor target object B2 and the sensor target object B0. That is, the sensor target object B2 is fused/integrated into the fusion target object FB1.

In contrast, when the sensor target object Bn serving as the grouping candidate does not satisfy at least one of the conditions (the condition G1 and the condition G2) for (with respect to) the grouping reference target object Bs, the DSECU selects/designates the sensor target object Bn as another grouping reference target object Bs. Thereafter, the DSECU determines whether or not a sensor target object serving as a grouping candidate (which is a sensor target object which has not been fused/integrated into the fusion target object before that time point) satisfies both of the conditions (the condition G1 and the condition G2) for (with respect to) that designated another grouping reference target object Bs. The above processes are the new target object generation grouping processes.

Figure 5A:
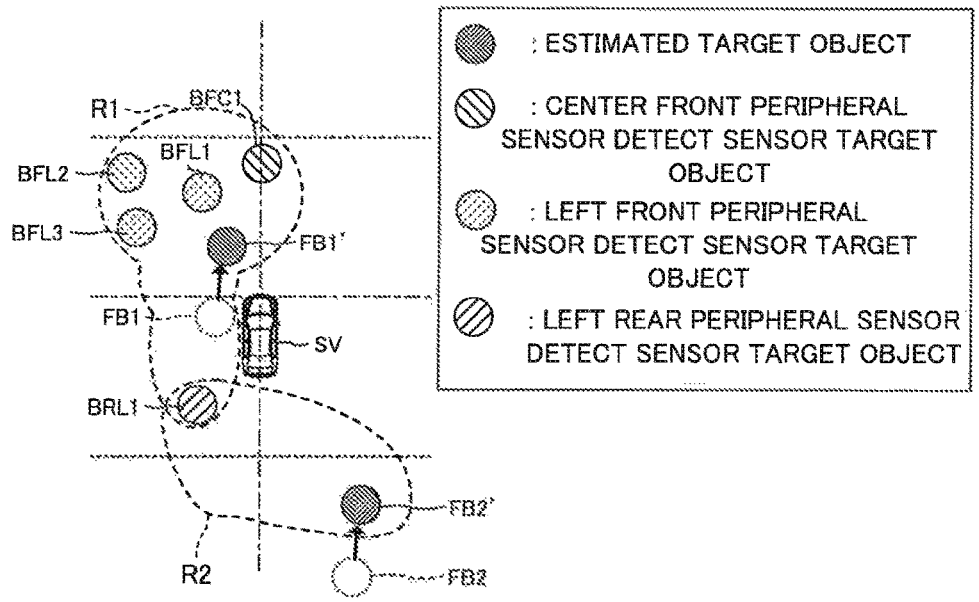
FIG. 5A is a diagram for explaining a grouping processes for integrating sensor target objects.

On the other hand, when a fusion target object FBn has already been generated/formed before the present time point (in other words, a fusion target object FBn had been generated at the time point of the previous calculation which is a calculation performed the calculation time period Δt before), the DSECU updates the fusion target object FBn as follows. That is, when the fusion target object FBn is present at the time point of starting the present calculation, the DSECU updates this fusion target object FBn as follows. Further, the DSECU calculates the presence probability of the updated fusion target object FBn. Hereinafter, as shown in FIG. 5A, the method of updating (generating) the fusion target object will be explained, using an example in which two of fusion target objects FB1 and FB2 (that is, FBn, n=1, 2) have already been generated/formed at the time point of starting the present calculation. The fusion target object generated or updated in the previous calculation is referred to as a "previous fusion target object", and target object information of/on the previous fusion target object is referred to as "previous fusion target object information".

The DSECU estimates/extrapolate "a position and a relative speed" of the fusion target object FBn at the time point of the present calculation, based on the previous fusion target object information. The estimated/extrapolated fusion target object is referred to as an "estimated target object FBn'." For example, in the example shown in FIG. 5A, the estimated target objects FB1' and FB2' are generated based on the previous fusion target objects FB1 and FB2, respectively.

More specifically, for descriptive purposes, in the X-Y coordinate (hereinafter referred to as a "previous X-Y coordinate") at the time point of the previous calculation, the X-Y coordinate position of the previous fusion target object FBn is expressed as (Xfn, Yfn), the longitudinal relative speed of the previous fusion target object FBn is expressed as Vxfn, and the lateral relative speed of the previous fusion target object FBn is expressed as Vyfn. In this case, the DSECU calculates the X-Y coordinate position (Xfn', Yfn') of the estimated target object FBn' in the previous X-Y coordinate according to the following expression.

$$Xfn' = Xfn + \Delta t \cdot Vxfn$$

$$Yfn' = Yfn + \Delta t \cdot Vyfn$$

Thereafter, the DSECU converts (performs a coordinate transformation) the calculated "position (Xfn', Yfn') of the estimated target object FBn' in the previous X-Y coordinate" to the X-Y coordinate position in the X-Y coordinate (hereinafter referred to as a "present X-Y coordinate") at the time point of the present calculation. Further, the DSECU converts (performs a coordinate transformation) the "relative speed (Vxfn, Vyfn) of the previous fusion target object FBn" in the previous X-Y coordinate to a "relative speed in the present X-Y coordinate" to set a "relative speed of the estimated target object FBn' in the present X-Y coordinate" to that converted relative speed. It should be noted that, for example, the DSECU recognizes a relationship between the previous X-Y coordinate and the present X-Y coordinate based on "the vehicle speed V, the lateral deviation Dy, and the yaw angle θy" of the own vehicle SV as well as the time Δt to perform the coordinate transformation of "the X-Y coordinate position and the relative speed" based on the relationship.

Further, the DSECU sets the "target object width and target object length" of the estimated target object FBn' to the same respective values as the "target object width Wf and the target object length Lf" of the previous fusion target object FBn. In this manner described above, the DSECU generates/forms the estimated target objects FBn' (i.e., FB1' and FB2').

The estimated target objects FBn' is a target object serving as a reference for grouping (integrating/fusing) a sensor target object (hereinafter also referred to as a "present detected sensor target object") which is newly detected at the time point of the present calculation into the already generated fusion target (an existing (already-present) object). Therefore, the identification information of the estimated target object FBn' is set to the same information as the identification information of the previous fusion target object FBn. That is, for example, the identification information of the estimated target object FB1' is maintained at "ID1", which is the same as the identification information of the previous fusion target object FB1. The identification information of the estimated target FB2' is maintained at "ID2", which is the same as the identification information of the previous fusion target object FB2.

Next, the DSECU selects/extracts the present sensor target object which is qualified to be the grouping candidate for the estimated target object FBn'. This selection/extraction is performed based on the position of the estimated target object FBn'. More specifically, the DSECU selects/extracts, as a grouping target of/for the estimated target object FBn', a "present detected sensor target object" which is present within a grouping target area/region determined based on the position of the estimated target object FBn'.

In the example shown in FIG. 5A, the sensor target object BFC1 is the present detected sensor target object detected by the central front peripheral sensor 16FC at the present time point. The sensor target objects BFL1, BFL2, and BFL3 are the present detected sensor target objects detected by the left front peripheral sensor 16FL at the present time point. The sensor target object BRL1 is the present detected sensor target object detected by the left rear peripheral sensor 16RL at the present time point. Neither the right front peripheral sensor 16FL nor the right rear peripheral sensor 16RR detects a present detected sensor target object at the present time point. Therefore, the grouping candidates for the estimated target object FB1' are "the sensor target object BFC1, the sensor target objects BFL1, BFL2 and BFL3, and the sensor target object BRL1" present in the grouping target area/region (those objects are surrounded by a dotted line R1). The grouping candidate for the estimated target object FB2' is "the sensor target object RL1" present in the grouping target area (the object is surrounded by a dotted line R2).

The DSECU carries out grouping processes (hereinafter, referred to as a "first grouping process") for associating (linking) the "present detected sensor target object" with (to) the "previous fusion target object FBn", based on the estimated target object FBn'.

That is, the DSECU firstly selects/designates the estimated target object FBn' as the grouping reference target object. Next, the DSECU determines whether or not the present detected sensor target object designated as the grouping candidate satisfies the grouping condition consisting of the above condition G1 and condition G2 for (with respect to) the grouping reference target object (that is, the estimated target object FBn'). The target object information (the X-Y coordinate position, the longitudinal relative speed, and the lateral relative speed) of the estimated target object FBn' is used as the target object information of the grouping reference target object, when the grouping reference target object is the grouping reference target object. In the first grouping process, the threshold longitudinal distance Xth used in the condition G1 is a value of "a target object length L1×0.5+α predetermined value α" (that is, Xth=L1×0.5+α), and the threshold lateral distance Yth used in the condition G2 is a value of "a target object width W1×0.5+α predetermined value β" (that is, Yth=W1×0.5+β). "The target object length and the target object width" of the estimated target object FBn' are used for the target object length L1 and the target object width W1, respectively.

When the present detected sensor target object designated as the grouping candidate satisfies both of the conditions condition G1 and condition G2 for (with respect to) the estimated target object FBn' designated/selected as the grouping reference target object, the DSECU fuses/integrates the estimated target object FBn' and that present detected sensor target object to update (generate) the fusion target object FBn. The DSECU performs the processes described above for all of the present detected sensor target objects designated as the grouping candidates to update the fusion target object FBn. The identification information of this updated fusion target object FBn is maintained at the same information as the identification information of the estimated target object FBn'. As a matter of course, when the present detected sensor target object designated as the grouping candidate does not satisfy at least one of the conditions (the condition G1 and the condition G2) for (with respect to) the estimated target object FBn' designated as the grouping reference target object, the DSECU does not fuse/integrate the estimated target object FBn' and this present detected sensor target objects.

Figure 5B:
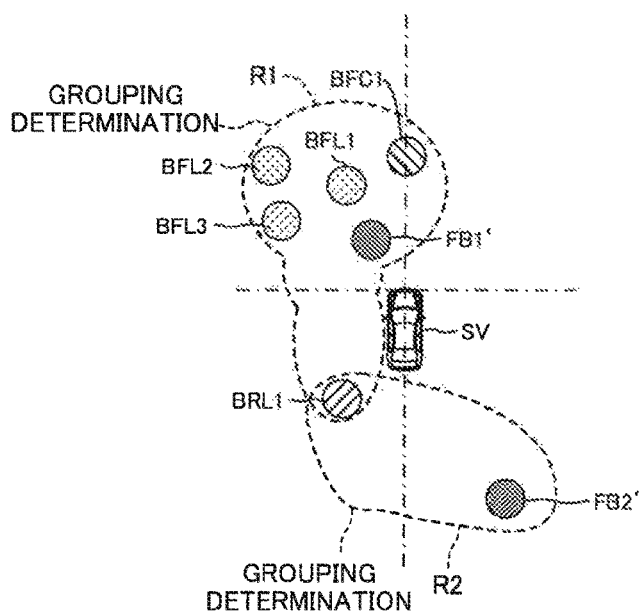
FIG. 5B is a diagram for explaining the grouping processes for integrating the sensor target objects.
Figure 6:
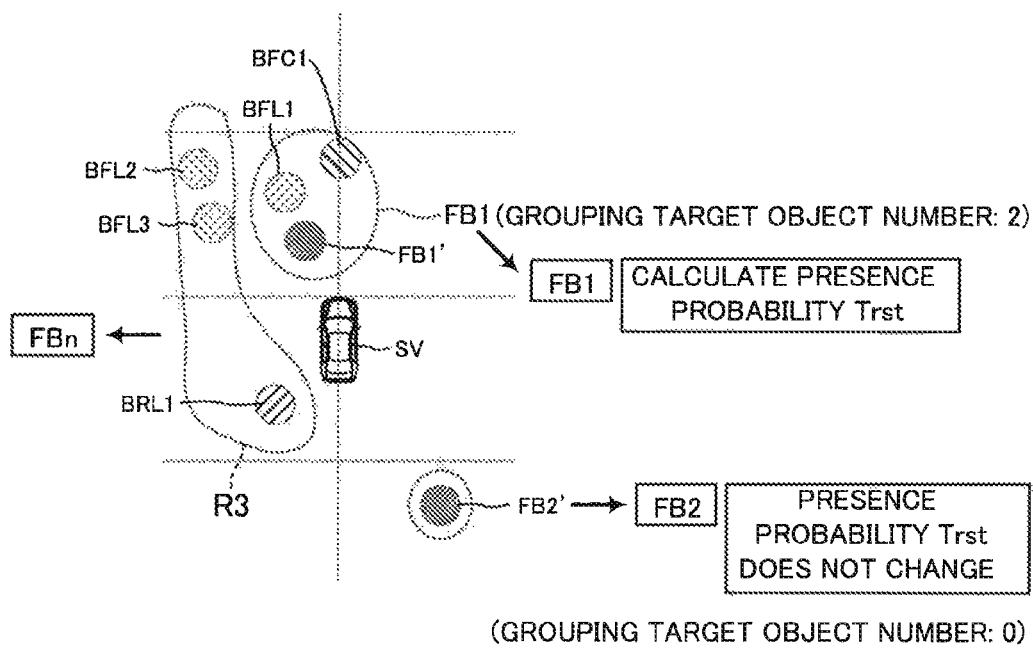
FIG. 6 is a diagram for explaining the grouping processes for integrating the sensor target objects.

In the example shown in FIG. 5B, it is assumed that the sensor target object BFC1 and the sensor target object BFL1 among present detection sensor target objects that are the grouping candidates and that are surrounded by the dotted line R1 satisfies both of the conditions (the condition G1 and the condition G2, that is, the grouping conditions), for (with respect to) the estimated target object FB1'. In this case, as shown in FIG. 6, the DSECU fuses/integrates the estimated target object FB1' and "the sensor target object BFC1 and the sensor target object BFL1" to update (generate) the fusion target object FB1. Therefore, the number of sensor target objects (a grouping target object number) determined to be fused/integrated to the estimated target object FB1' is "2". Further, the DSECU calculates the presence probability of the updated fusion target object FB1. It should be noted that the method for calculating the presence probability will be described later in more detail.

Further, in the example shown in FIG. 5B, it is assumed that the sensor target object BRL1 which is the grouping candidate does not satisfy the grouping conditions for (with respect to) the estimated target object FB2'. That is, it is assumed that there is no sensor target object satisfying the grouping conditions among the present detection target objects that are the grouping candidate and that are surrounded by the dotted line R2, for (with respect to) the estimated target object FB2'. In other words, the number of sensor target objects (a grouping target object number) determined to be fused/integrated to the estimated target object FB2' is "0". In this case, as shown in FIG. 6, the DSECU obtains the fusion target object FB2 through extrapolation. That is, the DSECU regards/considers the estimated target object FB2' as the present fusion target object FB2 which is to be obtained by extrapolating the previous fusion target object FB2, and replaces the target object information of the present fusion target object FB2 with the target object information of the estimated target object FB2'. This process is referred to as an "extrapolation of the fusion target object" or an "extrapolation process of the fusion target object". It should be noted that the probability of the fusion target object is not changed so as to be maintained when the fusion target object is extrapolated. That is, the DSECU maintains the probability of the extrapolated fusion target object FB2 at the value calculated as the probability of the fusion target object FB2 up to that time point.

Further, when there is at least the present detected sensor target object (hereinafter, also referred to as a "residual sensor target object") which has not been fused/integrated to any of the estimated target objects through the first grouping process, the DSECU attempts to group the residual sensor target object(s). This processes is referred to as a "second grouping process".

For example, in the example shown in FIG. 6, the "sensor target objects BFL2 and BFL3, and the sensor target object BRL1" surrounded by the dotted line R3 are the residual sensor target objects. The DSECU performs the same processes as the above-described "new target object generation grouping processes" as the second grouping process, for those residual sensor target objects.

That is, the DSECU selects/designates one of the residual sensor target objects as the grouping reference target object and selects/extracts a residual sensor target object(s) which is qualified to be a grouping candidate for (with respect to) the selected/designated grouping reference target object. Next, the DSECU determines whether or not the residual sensor target object selected/designated as the extracted grouping candidate satisfies the above grouping conditions for (with respect to) the selected/designated grouping reference target object. Thereafter, the DSECU fuses/integrates the grouping reference target object and the residual sensor target object which satisfies the grouping conditions to generate/form a new fusion target object FBn The DSECU assigns identification information (ID) for distinguishing (identifying) the new fusion target object FBn from the fusion target objects excluding the new fusion target object FBn to the new fusion target object FBn. The DSECU performs the processes described above for all of the residual sensor target objects.

Incidentally, as the previous fusion target object FB2 described above, when there is no sensor target object (present detected sensor target object) which can be fused/integrated to the "estimated target object FBn' corresponding to the previous fusion target object FBn" through the first grouping process, it can be considered that the three-dimensional object corresponding to the previous fusion target object FBn is no longer present around the own vehicle SV. That is, when the grouping target object number (that is, the number of present detected sensor target objects that can be fused/integrated to the estimated target object FBn') is "0", it can be considered that the fusion target object FBn has been lost.

Figure 7:
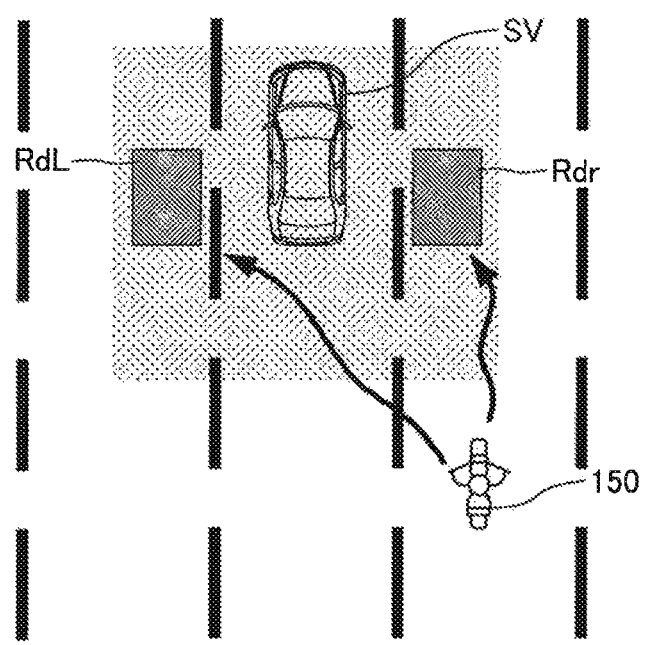
FIG. 7 is a plan view for illustrating the own vehicle, a three-dimensional object, and a road for explaining extrapolation of a fusion target object.

However, such a situation may arise, as shown in FIG. 7, when the three-dimensional object 150 which has been detected as the fusion target object FB2 by the DSECU temporarily enters either the left blind spot area RdL or the right blind spot area Rdr where the millimeter waves are not radiated from any of the peripheral radar sensors 16a. That is, the above described situation may be a case where the three-dimensional object 150 corresponding to the fusion target object FB2 is actually present around the own vehicle SV, but the sensor target object (present detection sensor target object) is not detected from the three-dimensional object 150 at the time point of the present calculation. Note that, when there is no need to individually distinguish the left blind spot area RdL and the right blind spot area Rdr from each other, each of those blind spot areas is referred to as a "blind spot area Rd".

Therefore, if the DSECU determines that the fusion target object FBn has been lost (disappeared) immediately after the grouping target object number with respect to the estimated target object FBn' becomes "0", that determination made by the DSECU may be erroneous.

In order to avoid such an erroneous determination, the DSECU forms/generates the present fusion target object FBn through the extrapolation based on the estimated target object FBn', when the grouping target object number with respect to the estimated target object FBn' is "0". When the DSECU starts the extrapolation of the fusion target object, it calculates a maximum extrapolation duration tg. It should be noted that a calculation method of the maximum extrapolation duration tg will be described later. The extrapolation of the fusion target object continues being performed until a duration (extrapolation duration) from the start of the extrapolation reaches a predetermined maximum extrapolation duration tg. That is, the extrapolation of the fusion target object is terminated when the extrapolation duration reaches the maximum extrapolation duration tg. It should be noted that the extrapolation of the fusion target object is terminated even before the extrapolation duration reaches the maximum extrapolation duration tg, when the sensor target object appears which can be fused/integrated to the estimated target object corresponding to the extrapolated fusion target object, and that sensor target object is fused/integrated to that estimated target object.

When the three-dimensional object which has temporarily entered into the blind spot area Rd of the peripheral radar sensor 16a comes out from that blind spot area, the sensor target object can be detected which satisfies the grouping conditions for (with respect to) the estimated target object corresponding to the extrapolated fusion target object. In this case, the DSECU fuses/integrates the detected sensor target object and the estimated target object to form/generate a fusion target object and finishes the extrapolation of the fusion target object. Those processes can reduce a possibility of occurrence of the erroneous determination described above.

In contrast, when the sensor target object which can satisfy the grouping conditions for (with respect to) the estimated target object corresponding to the extrapolated fusion target has not been detected before the time point at which extrapolation duration becomes equal to or longer than the maximum extrapolation duration tg, it is unlikely that the three-dimensional object corresponding to that fusion target object (the extrapolated fusion target) has been present temporarily within the blind spot area, but rather, it is highly likely that it is no longer present around the own vehicle SV. Therefore, in this case, the DSECU determines that the fusion target object has been lost.

<Calculation of Presence Probability>

As described later, the DSECU calculates the maximum extrapolation duration (period of time) based on the presence probability of the fusion target object. Thus, when the DSECU updates the fusion target object, the DSECU calculates the presence probability of the updated fusion target object. Specifically, the DSECU adds a product of a predetermined presence probability rup and Cy (=rup·Cy) to a presence probability $Trst_{pre}$ of the previous fusion target object according to the following Expression (A), to thereby calculate a presence probability Trst at the time point of the present calculation.

$$Trst=Trst_{pre}+rup \cdot Cy \tag{A}$$

In the Expression (A), each of Trst, $Trst_{pre}$, rup, and Cy is as follows.

Trst: the presence probability of the fusion target object at the time point of the present calculation.

$Trst_{pre}$: the presence probability of the previous fusion target object.

rup: a rate of increase (an increasing rate) of the presence probability.

Cy: a calculation cycle number (the number of the calculation cycles).

Figure 8:
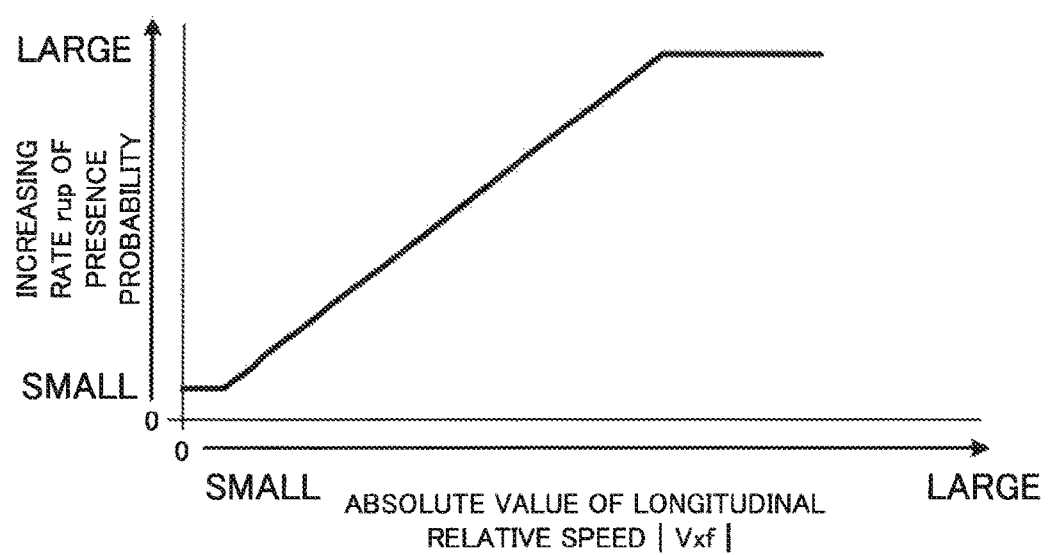
FIG. 8 is a graph for illustrating a relationship between a longitudinal relative speed and an increasing rate.

Therefore, the presence probability is calculated in such a manner that the presence probability increases, as the number of the calculation cycles of the calculation at which the fusion target object can be updated increases while the sensor target objects that can be fused/integrated to the fusion target object continue to be detected by the peripheral sensors 16*a*. The number of the calculation cycles is the number of calculations/operations or the times of the calculations/operations executed every time the predetermined time Δt elapses. In this case, as shown in FIG. 8, the DSECU sets the increasing rate rup of the presence probability in such a manner that the increasing rate rup increases as a magnitude (absolute value) of the longitudinal relative speed Vxf of the fusion target object increases.

As a result, the presence probability of the fusion target below which has a small magnitude of the longitudinal relative speed Vxf does not easily become large. For example, such a fusion target includes the followings.

A fusion target object having a small magnitude of the longitudinal relative speed Vxf which is formed/generated when a road surface, a wall, roadside objects, or the like is erroneously detected.

A fusion target object having a small magnitude of the longitudinal relative speed Vxf which is formed/generated when the sensor ghost is detected.

A fusion target object having a small magnitude of the longitudinal relative speed Vxf which is formed/generated when an other vehicle having a speed approximately equal to a speed of the own vehicle SV is detected.

In contrast, the presence probability of the fusion target which has a large magnitude of the longitudinal relative speed Vxf and which is approaching the own vehicle from a distant place/position, easily becomes large.

<Calculation of Maximum Extrapolation Duration>

Figure 9:
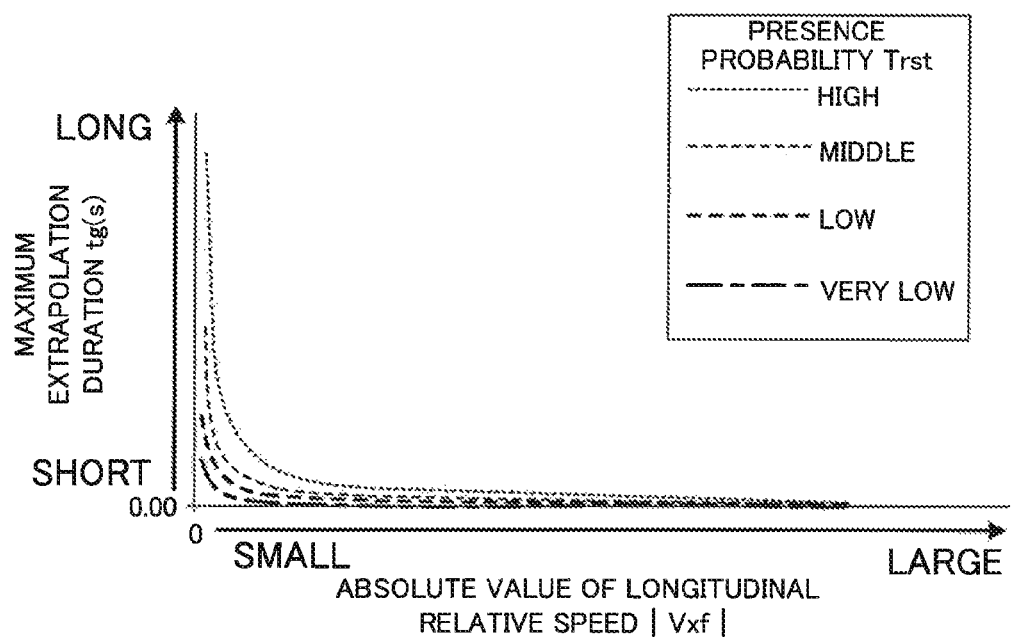
FIG. 9 is a graph illustrating a relationship between the longitudinal relative speed and a maximum extrapolation duration and a presence probability.

The DSECU calculates the maximum extrapolation duration based on the presence probability of the fusion target object. Specifically, as shown in FIG. 9, the DSECU calculates the maximum extrapolation duration in such a manner that the maximum extrapolation duration becomes longer (larger) as the presence probability is larger and the maximum extrapolation duration becomes longer (larger) as the magnitude of the longitudinal relative speed Vxf is smaller.

<Outline of Operation>

Figure 10:
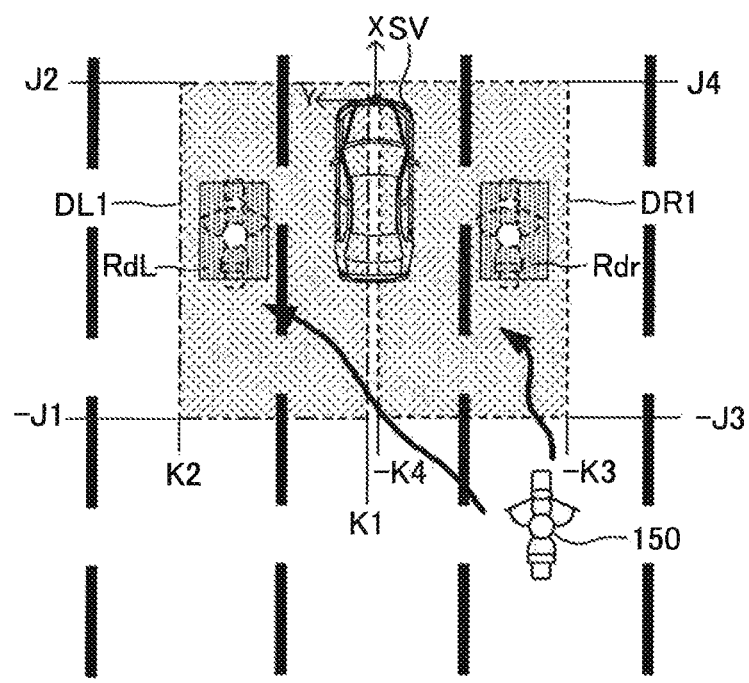
FIG. 10 is a plan view for illustrating the own vehicle, the three-dimensional object, and the road for explaining a blind spot area entering determination area.

As shown in FIG. 10, a case may arise where the "three-dimensional object 150 having a low relative speed with respect to the own vehicle SV" which has been recognized for a certain period as the fusion target object enters the blind spot area Rd (the left blind spot area RdL or the right blind spot area Rdr) of the peripheral radar sensors 16*a*, and thereafter, continues traveling at this low relative speed. In this case, the three-dimensional object 150 stays in the blind spot area Rd which the three-dimensional object 150 has entered, for a long time.

In this case, the sensor target object is not detected from the three-dimensional object 150. Therefore, the sensor target object which can be fused/integrated to the estimated target object corresponding to the three-dimensional object 150 is not detected. As a result, the DSECU starts the extrapolation (process) of the fusion target object. Thereafter, the DSECU continues the extrapolation of the fusion target object, when the three-dimensional object 150 continues staying in the blind spot area Rd, and thus, the sensor target object which can be fused/integrated to the estimated target object is not detected.

Further, when the three-dimensional object 150 continues staying (being present) in the blind spot area Rd for a time equal to or longer than the maximum extrapolation duration tg, it may be determined that the fusion target object corresponding to the three-dimensional object 150 has been lost despite that the three-dimensional object 150 is actually present in the blind spot area Rd. In this situation, when the lane changing support control request is generated, the lane changing support control may be started to be performed despite that the three-dimensional object which is an obstacle to the lane changing support (control) in the blind spot area Rd.

To cope with this situation/problem, when the DSECU of the first apparatus starts the extrapolation of the fusion target object, the DSECU determines whether or not that fusion target is "the three-dimensional object which is highly likely to stay in the blind spot area Rd after entering the blind spot area Rd, for a long time".

Specifically, the DSECU makes the following determination when the number (the grouping target object number) of the sensor targets determined to be able to be fused/integrated to the estimated target object is be "0". That is, the DSECU determines that the extrapolation target fusion target object is the three-dimensional object which is likely to stay in the blind spot area Rd for a long time, when (1) the AGE of the fusion target object (hereinafter, referred to as an "extrapolation target fusion target object") corresponding to the estimated target object is equal to or larger than a first threshold AGE, and (2) the absolute value |Vxf| of the relative speed (the longitudinal relative speed Vxf) of the extrapolation fusion target object is smaller than a threshold relative speed Vxth.

The AGE of the fusion target object will be described later. The threshold relative speed Vgxth is set to an arbitrary value appropriate for the determination. It should be noted that the DSECU may determines that the extrapolation target fusion target object is the three-dimensional object which is likely to stay in the blind spot area Rd for a long time, when only the above-described condition on the relative speed of the extrapolation target fusion target object is satisfied (that is, |Vxf|<Vgxth).

The AGE of the fusion target object is set to the largest AGE among the AGEs of the sensor target objects belonging to the fusion target object. The AGE of the fusion target object is indicative of a duration time period (which corresponds to the number of updating the fusion target object, that is, the number of calculations) for which the fusion target object continues being formed/generated from when the fusion target object was newly generated. The AGE of the fusion target object is also referred to as a "reliability of the fusion target". The first threshold AGE is also referred to as a "first threshold reliability". The first threshold AGE is set to an arbitrary value appropriate for this determination.

Further, when a position of the extrapolation target fusion target is within a left blind spot area entering determination area DL1, the DSECU determines that there is a high possibility (probability) that the three-dimensional object corresponding to the extrapolation target fusion target object has entered the left blind spot area RdL. The left blind spot area entering determination area DL1 includes/covers the left blind spot area RdL and is set so as to have an area larger than an area of the left blind spot area RdL.

Similarly, when the position of the extrapolation target fusion target object is within a right blind spot area entering determination area DR1, the DSECU determines that there is a high possibility (probability) that the three-dimensional object corresponding to the extrapolation target fusion target object has entered the right blind spot area Rdr. The right blind spot area entering determination area DR1 includes/covers the right blind spot area Rdr and is set so as to have an area larger than the area of the right blind spot area Rdr.

Then, when the DSECU determines that the extrapolation target fusion target object is the three-dimensional object which is likely to stay (or having a possibility of staying) in the blind spot area Rd (either the left blind spot area RdL or the right blind spot area Rdr) for a long time and the extrapolation target fusion target object has represented the three-dimensional object which is highly likely to have entered (or having a high possibility of having entered) the blind spot area Rd (either the left blind spot area RdL or the right blind spot area Rdr), the DSECU does not perform the lane changing support control to the lane (hereinafter, referred to as "fusion target object presence side lane") on the side where the blind spot area Rd (either the left blind spot area RdL or the right blind spot area Rdr) is located which has been determined to be a blind spot are which the extrapolation target fusion target object is likely to have entered. In other words, in this case, the DSECU sets a "state for allowing of executing the lane changing support control in which the adjacent target lane is set to the fusion target object presence side lane" to an execution-prohibited state.

Further, when the DSECU sets the "state for allowing of executing the lane changing support control in which the adjacent target lane is set to the fusion target object presence side lane" to the execution-prohibited state, the DSECU determines whether or not the three-dimensional object which has been determined to be highly likely to have entered the blind spot area Rd is highly likely to have come out of this blind spot area Rd. When the DSECU determines that the three-dimensional object which has been determined to be likely to have entered the blind spot area Rd is highly likely to have come out of this blind spot area Rd, the DSECU sets the "state for allowing of executing the lane changing support control in which the adjacent target lane is set to the fusion target object presence side lane" to an execution-permitted state.

More specifically, when the state for allowing of executing the lane changing support control to the left lane has been set to the execution-prohibited state, the DSECU determines whether or not the three-dimensional object corresponding to the extrapolation target fusion target object which has caused the setting of that state is highly likely to have come out of the left blind spot area RdL.

Figure 11:
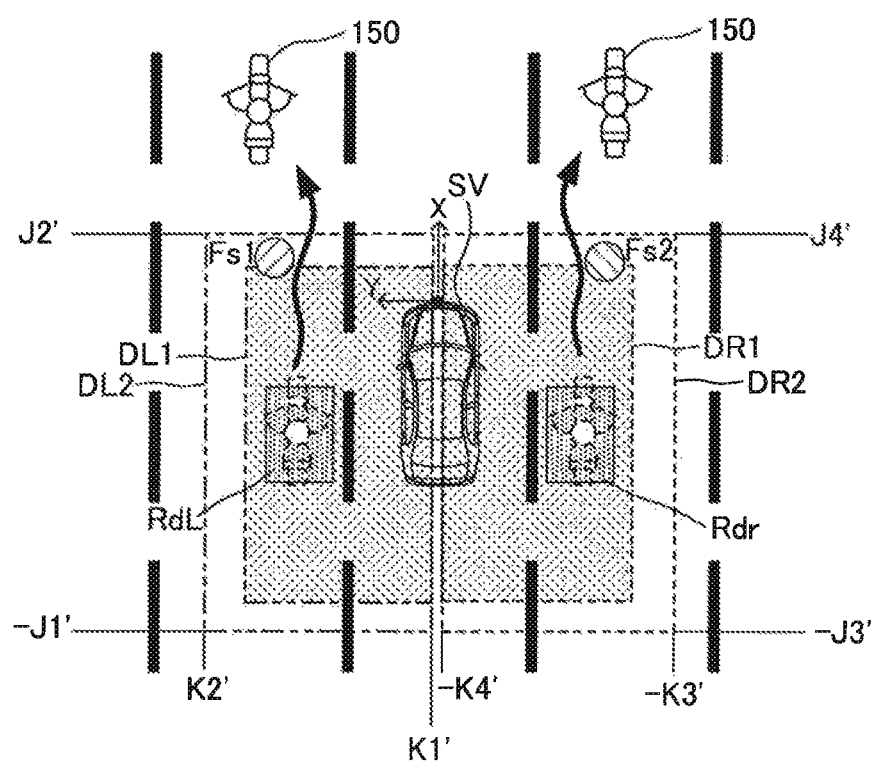
FIG. 11 is a plan view for illustrating the own vehicle, the three-dimensional object, and the road for explaining a blind spot area leaving determination area.

In this case, as shown in FIG. 11, the DSECU determines that it is highly likely that the three-dimensional object corresponding to the extrapolation target fusion target object which has caused the setting of that state has come out of the left blind spot area RdL, when, (1) a position of a fusion target object Fs1 when the fusion target object Fs1 is newly generated is within a left blind spot area leaving determination area DL2, and (2) an AGE of the fusion target object Fs1 becomes equal to or larger than a second threshold AGE.

It should be noted that DSECU may determine that it is highly likely that the three-dimensional object corresponding to the extrapolation target fusion target object has come out of the left blind spot area RdL, when only the condition (1) on the position when the fusion target object Fs1 is newly generated becomes satisfied.

It should be noted that the left blind spot area leaving determination area DL2 includes/covers the left blind spot area entering determination area DL1 and is set so as to have a range larger than the area of the left blind spot area entering determination area DL1. The second threshold AGE is set to a value larger than the first threshold AGE. Accordingly, when the three-dimensional object corresponding to the newly generated fusion target object Fs1 immediately enters again (returns to) the left blind spot area entering determination area DL1, the DSECU can immediately set the state for allowing of executing the lane changing support control to the left (left lane) to the execution-prohibited state. The second threshold AGE is also referred to as a "second threshold reliability". The second threshold AGE is set to an arbitrary value appropriate for the determination.

When the DSECU determines that it is highly likely that the three-dimensional object corresponding to the extrapolation target fusion target object has come out of the left blind spot area RdL, the DSECU sets the state for allowing of executing the lane changing support control to the left lane to the execution-permitted state.

On the other hand, when the state for allowing of executing the lane changing support control to the right lane has been set to the execution-prohibited state, the DSECU determines whether or not the three-dimensional object corresponding to the extrapolation target fusion target object which has caused the setting of that state is highly likely to have come out of the right blind spot area Rdr.

In this case, as shown in FIG. 11, the DSECU determines that it is highly likely that the three-dimensional object corresponding to the extrapolation target fusion target object has come out of the right blind spot area Rdr, when, (3) a position of a fusion target object Fs2 when the fusion target object Fs2 is newly generated is within a right blind spot area leaving determination area DR2, and (4) an AGE of the fusion target object Fs2 becomes equal to or larger than the second threshold AGE.

It should be noted that DSECU may determine that it is highly likely that the three-dimensional object corresponding to the extrapolation target fusion target object has come out of the right blind spot area Rdr, when only the condition (3) on the position when the fusion target object Fs2 is newly generated becomes satisfied. The right blind spot area leaving determination area DR2 includes/covers the right blind spot area entering determination area DR1 and is set so as to have a range larger than the area of the right blind spot area entering determination area DR1.

When the DSECU determines that it is highly likely that the three-dimensional object corresponding to the extrapolation target fusion target object has come out of the right blind spot area Rdr, the DSECU sets the state for allowing of executing the lane changing support control to the right lane to the execution-permitted state.

(Specific Operation)

Next, specific operations of the first apparatus will be described. When a predetermined timing arrives, the CPU of the DSECU executes routines shown in FIGS. 12 to 18, every time the predetermined time (predetermined calculation period) $\Delta t$ elapses.

Figure 12:
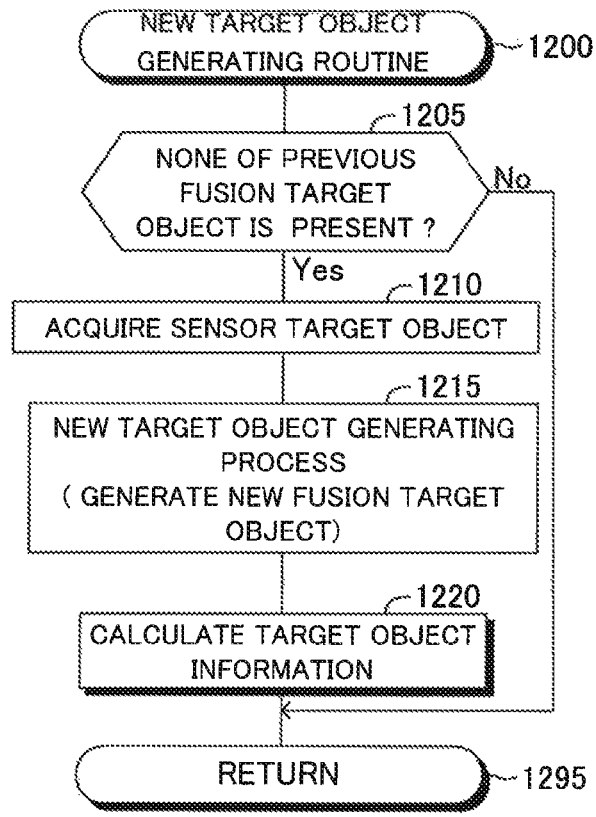
FIG. 12 is a flowchart for illustrating a routine executed by a CPU of a driving support ECU shown in FIG. 1.

Therefore, when an appropriate timing arrives, the CPU starts processing from step 1200 of a new target object generating routine of FIG. 12, and proceeds to step 1205 to determine whether none of the above-described previous fusion target object is present. In other words, at step 1205, the CPU determines whether the fusion target object has neither been generated nor updated at the time point of the previous calculation (one calculation period $\Delta t$ before). When none of the previous fusion target object is present, the CPU sequentially executes processes of steps 1210 to 1220 described below, and then proceeds to step 1295 to tentatively terminate the present routine.

Step 1210: the CPU acquires the sensor target object (that is, the present detected sensor target object) detected by the peripheral radar sensor 16a at the time point of the present calculation. Although not shown in the figure, when no sensor target object is acquired at step 1210, the CPU proceeds directly to step 1295 to tentatively terminate the present routine.

Step 1215: the CPU executes the above-described new target object generation grouping processes to generate the new fusion target object.

Step 1220: the CPU acquires/calculates the fusion target object information including "the target object width Wf, the target object length Lf, the coordinate position (Xf, Yf), and the relative speed (the longitudinal relative speed Vxf and the lateral relative speed Vyf)" of the newly generated fusion target object, by the above-described method.

In the present example, the coordinate position (Xf, Yf) of the fusion target object is the coordinate (Xfc, Yfc) of the center position of the fusion target object. The CPU assigns identification information (ID) which is one of the fusion target object information to the newly generated fusion target object information. Further, the CPU sets the value of the calculation cycle number Cy which is one of that target object information to "1".

When the previous fusion target object is present at the time point at which the CPU executes the process of step 1205, the CPU directly proceeds to step 1295 from step 1205 to tentatively terminate the present routine.

Figure 13:
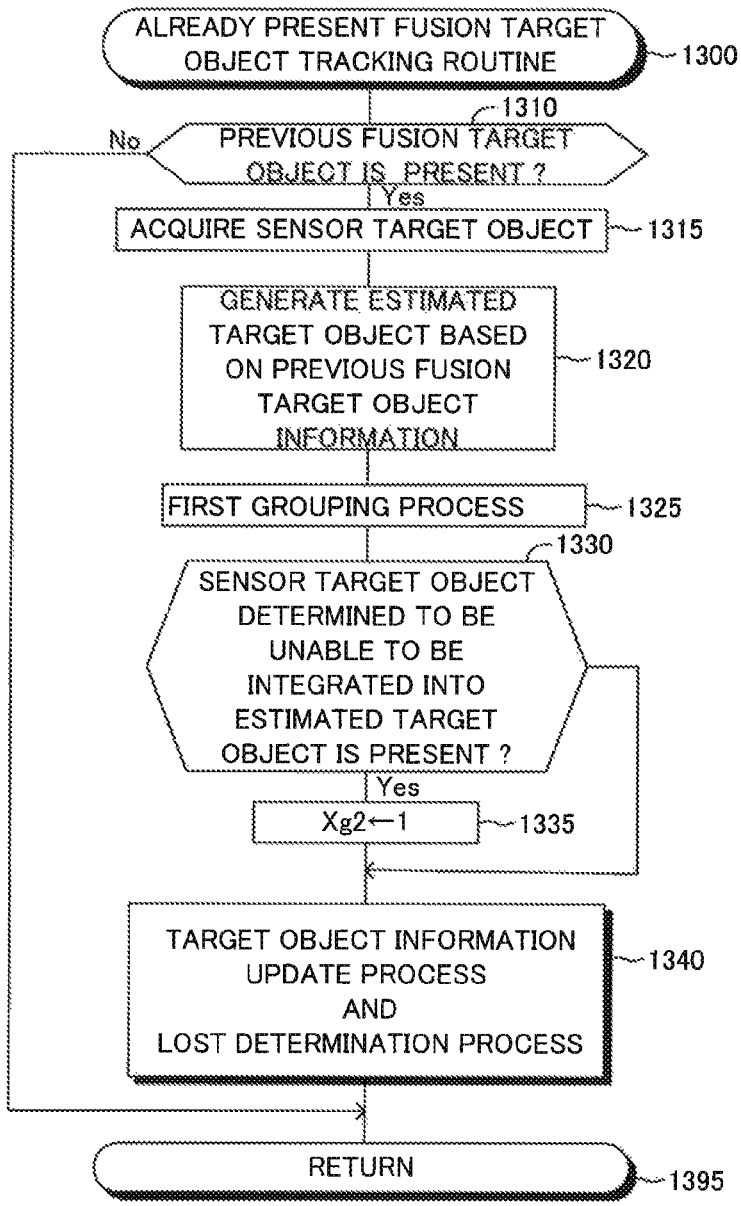
FIG. 13 is a flowchart for illustrating a routine executed by the CPU of the driving support ECU shown in FIG. 1.

Further, when an appropriate timing arrives, the CPU starts processing from step 1300 of an existing (already-present) fusion target object tracking routine shown in FIG. 13, and proceeds to step 1310 to determine whether or not the previous fusion target object is present. In other words, the CPU determines whether or not the fusion target object had been generated or updated at the time point of the previous calculation (one calculation period $\Delta t$ before). When the previous fusion target object is not present, the CPU makes a "No" determination at step 1310 and proceeds directly to step 1395 to tentatively terminate the present routine.

When the previous fusion target object is present, the CPU makes a "Yes" determination at step 1310 and proceeds to step 1315 to acquire the sensor target object (that is, the present detected sensor target object) detected by the peripheral radar sensor 16a at the time point of the present calculation.

Thereafter, the CPU proceeds to step 1320 to generate the estimated target object based on the previous fusion target object information in accordance with the above-described method. In this case, the identification information of the estimated target object is set to be the same as the identification information of the previous fusion target object information from which the estimated target object was generated.

Thereafter, the CPU proceeds to step 1325 to execute the above-described first grouping process based on the estimated target object generated at step 1320. That is, the CPU fuses/integrates the sensor target objects (present detected sensor target objects) that satisfy the above grouping conditions for (with respect to) the estimated target object so as to link (associate) the sensor target objects acquired at step 1315 to the previous fusion target object, to thereby update (generate) the present fusion target object.

Thereafter, the CPU proceeds to step 1330 to determine whether or not the sensor target object determined to be unable to be fused/integrated to the estimated target object is present, among the sensor target objects acquired at step 1315.

When the sensor target object determined to be unable to be fused/integrated to the estimated target object is present, the CPU makes a "Yes" determination at step 1330 and proceeds to step 1335 to set a value of the second grouping flag Xg2 to "1". Thereafter, the CPU proceeds to step 1340. It should be noted that the value of the second grouping flag Xg2 is set to "0" in an initialization routine (not shown) executed when an unillustrated ignition key switch of the own vehicle SV is changed from OFF to ON.

In contrast, when the sensor target object determined to be unable to be integrated into the estimated target object is not present, the CPU makes a "No" determination at step 1330 to directly proceed to step 1340.

Figure 14:
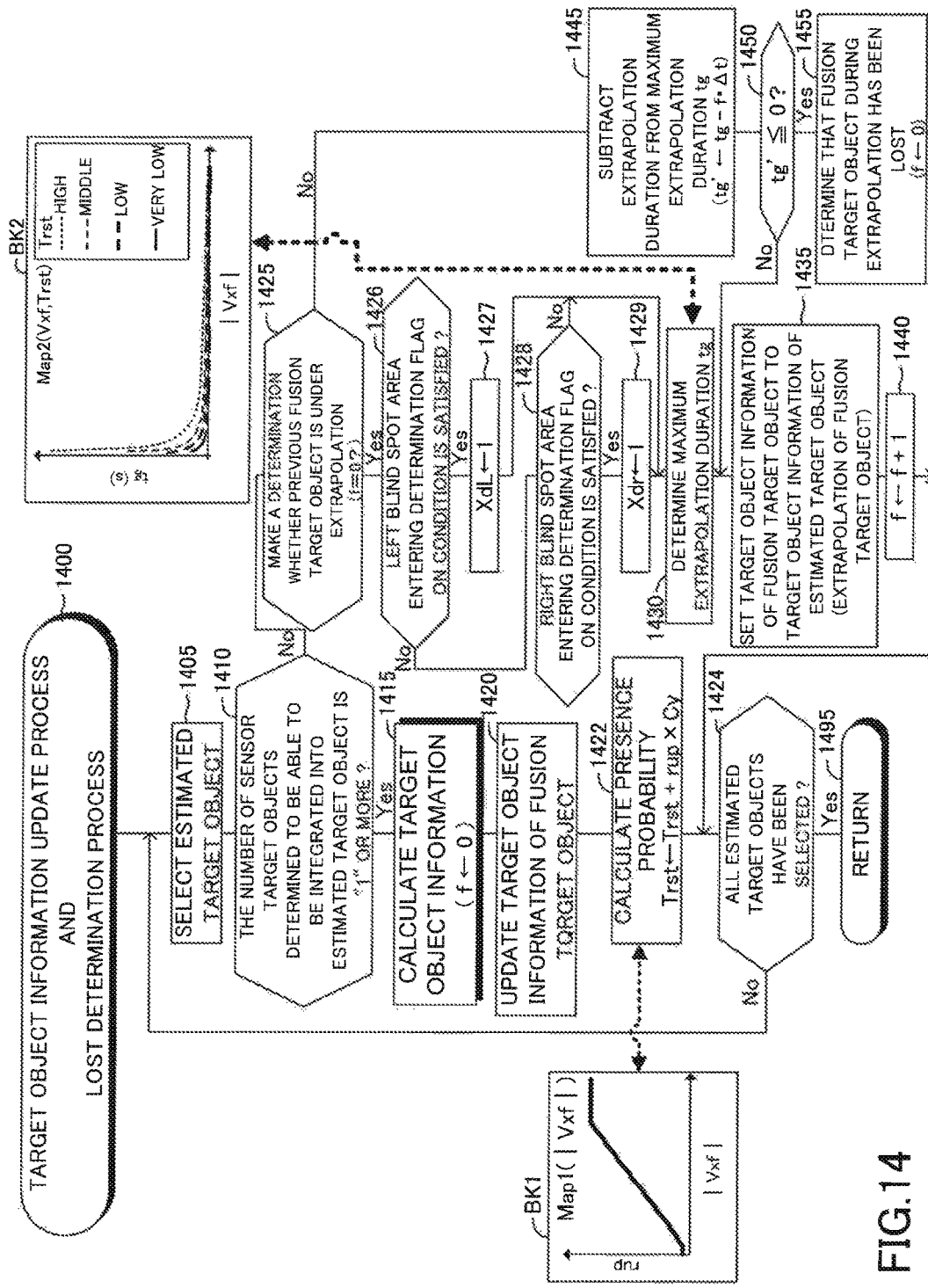
FIG. 14 is a flowchart for illustrating a routine executed by the CPU of the driving support ECU shown in FIG. 1.

The CPU proceeds to step 1340 to execute processes in the routine shown in FIG. 14, to thereby execute a target object information updating process and a lost determination process. It should be noted that each of the following flag values used in FIG. 14 is set to "0" at the above initial routine executed by the CPU.

A left blind spot area entering determination flag XdL: the left blind spot area entering determination flag XdL, when its value is "1", indicates that it is highly likely that the fusion target object having a high probability of staying in the left blind spot area RdL for a long time has entered the left blind spot area RdL (that is, there is a high possibility that the fusion target object is present in the left blind spot area RdL).

The left blind spot area entering determination flag XdL, when its value is "0", indicates that it is highly likely that the fusion target object which entered the left blind spot area RdL has come out of the left blind spot area RdL (that is, there is a high possibility that the fusion target object is not present in the left blind spot area RdL).

A right blind spot area entering determination flag Xdr: the right blind spot area entering determination flag Xdr, when its value is "1", indicates that it is highly likely that the fusion target object having a high probability of staying in the right blind spot area Rdr for a long time has entered the right blind spot area Rdr. (that is, there is a high possibility that the fusion target object is present in the right blind spot area Rdr).

The right blind spot area entering determination flag Xdr, when its value is "0", indicates that it is highly likely that the fusion target object which entered the left blind spot area RdL has come out of the right blind spot area Rdr (that is, there is a high possibility that the fusion target object is not present in the right blind spot area Rdr).

When the CPU proceeds to step 1340, the CPU proceeds to step 1405 via step 1400 shown in FIG. 14 to select an arbitrary estimated target object. Next, the CPU proceeds to step 1410, and determines whether or not the grouping target object number of the selected estimated target object (that is the number of the "sensor target objects determined to be able to be fused/integrated to the selected estimated target object selected at step 1405") through the first grouping process executed at step 1325 is "1" or more.

When the grouping target object number is "1" or more, the CPU makes a "Yes" determination at step 1410. Then, the CPU proceeds to step 1415 to calculate "the target object width Wf, the target object length Lf, the coordinates (Xfc, Yfc) of the center position, the relative speed (the longitudinal relative speed Vxf and the lateral relative speed Vyf), and the calculation cycle number Cy" included in the fusion target object information of the fusion target object, based on the sensor target object information of the sensor target objects fused/integrated so as to constitute the fusion target object. In this case, the calculation cycle number Cy is incremented by "+1". Further, the CPU sets the value of the number of consecutive extrapolated frames f included in the fusion target object information to "0". The value of this consecutive extrapolated frame number f will be described later.

After the CPU finishes the process of step 1415, the CPU proceeds to step 1420 to update the fusion target object information with the fusion target object information calculated at step 1415.

Next, the CPU proceeds to step 1422 to calculate the presence probability Trst of the fusion target information at the time point of the present calculation. Specifically, the CPU first calculates the increasing rate rup of the presence probability by applying the absolute value of the longitudinal relative speed Vxf included in the fusion target object information updated at step 1420 to a lookup table Map1 shown in the block BK1. The relationship defined by the lookup table Map1 is represented by the graph shown in FIG. 8. It should be noted that a lookup table may be referred to as a "Map". Next, the CPU calculates the present presence probability Trs through applying the previous presence probability Trst$_{pre}$, the increasing rate rup, and the calculation cycle number Cy to the above-described Expression (A) (Trst=Trst$_{pre}$+rup·Cy). The calculation cycle number Cy is the number of updating (the number of calculations) the fusion target object after the fusion target object was generated.

Next, the CPU proceeds to step 1424 to determine whether or not all of the estimated target objects present at the time point of the present calculation have been selected. When at least one of the estimated target objects has not been selected yet, the CPU makes a "No" determination at step 1424 to return to step 1405, at which the CPU selects the estimated target object which has not been selected yet. In contrast, when all of the estimated target objects have been selected, the CPU makes a "Yes" determination at step 1424 to proceed to step 1395 of FIG. 13 via step 1495.

When the number of the sensor target objects (grouping target object number) determined to be able to be fused/integrated to the estimated target object selected at step 1405 is "0" at the time point at which the CPU executes the process of step 1410, the CPU executes the above-described extrapolation process (extrapolation) of the fusion target object. That is, in this case, the CPU makes a "No" determination at step 1410 and proceeds to step 1425 to determine whether or not "the previous fusion target object, which is a base (origin) for the estimated target object which was selected at step 1405 and whose number of the sensor target objects to be fused/integrated to that the estimated target object is "0"" is not an object obtained through the extrapolation process. In actuality, the CPU makes this determination at step 1425 through determining whether or not the value of the number of consecutive extrapolated frames f with respect to the previous fusion target object is "0".

The value of the number of consecutive extrapolated frames f was set to "0" at the above described step 1415 when the previous fusion target object had not been extrapolated. Therefore, when the value of the number of consecutive extrapolated frames f is "0" at the time point when the CPU executes the process of step 1425, it can be determined that the previous fusion target object had not been extrapolated.

When the previous fusion target object is not a fusion target object generated through the extrapolation (that is, when the value of the number of consecutive extrapolated frames f is "0"), the CPU makes a "Yes" determination at step 1425 and proceeds to step 1426 to determine whether or not a left blind spot area entering determination ON condition is satisfied. The left blind spot area entering determination ON condition is satisfied when all of the following conditions LIN1, LIN2, and LIN3 are satisfied.

The condition LIN1 is a condition satisfied when the absolute value |Vxf| of the relative speed (the longitudinal speed Vxf) of the previous fusion target object is smaller than the threshold relative speed Vgxh.

The condition LIN2 is a condition satisfied when the AGE of the previous fusion target is equal to or larger than the first threshold AGE.

The condition LIN3 is a condition satisfied when the coordinate position (Xf, Yf) of the previous fusion target is within the left blind spot area entering determination area DL1.

It should be noted that, for example, the range of the left blind spot area entering determination area DL1 is defined as follows (refer to FIG. 10).

A longitudinal position range XdL1 (a range in the X axis direction): −J1<XdL1<J2.

A lateral position range YdL1 (a range in the Y axis direction): K1<YdL1<K2

A center position (X, Y): ((−J1+J2)/2, (K1+K2)/2).

Note that each of J1, J2, and K2 is a positive value, and K1 is a value equal to or larger than 0.

As described above, the range of the left blind spot area entering determination area DL1 includes the left blind spot area RdL.

More specifically, each of the values of J1, J2, K2, and K1 is set as follows.

−J1 is a value smaller than the X coordinate position of the rear end of the own vehicle SV, and equal to or smaller than the X coordinate position of the rear end of the left blind spot area RdL.

J2 is a value larger than the X coordinate position of the front end of the own vehicle SV, and equal to or larger than the X coordinate position of the front end of the left blind spot area RdL.

K1 is set to a value equal to or larger than 0, and equal to or smaller than the Y coordinate position of the left end of the own vehicle SV.

K2 is set to a value larger than the Y coordinate position of the left end of the own vehicle SV, and equal to or larger than the Y coordinate position of the left end of the left blind spot area RdL.

When the left blind spot area entering determination ON condition is satisfied, it can be considered that there is a high possibility (it is likely) that the three-dimensional object has entered the left blind spot area RdL. Thus, in this case, the CPU makes a "Yes" determination at step 1426 and proceeds to step 1427 to set the value of the left blind spot area entering determination flag XdL to "1". Thereafter, the CPU proceeds to step 1430.

In contrast, when the left blind spot area entering determination ON condition is not satisfied, the CPU makes a "No" determination at step 1426 and proceeds to step 1428 to determine whether or not the right blind spot area entering determination ON condition is satisfied. The right blind spot area entering determination ON condition is satisfied when all of the following conditions RIN1, RIN2, and RIN3 are satisfied.

The condition RIN1 is a condition satisfied when the absolute value |Vxf| of the relative speed (the longitudinal speed Vxf) of the previous fusion target is smaller than the threshold relative speed Vgxh.

The condition RIN2 is a condition satisfied when the AGE of the previous fusion target is equal to or larger than the first threshold AGE.

The condition RIN3 is a condition satisfied when the coordinate position (Xf, Yf) of the previous fusion target is within the right blind spot area entering determination area DR1.

It should be noted that, for example, the range of the right blind spot area entering determination area DR1 is defined as follows (refer to FIG. 10).

A longitudinal position range Xdr1 (a range in the X axis direction): −J3<Xdr1<J4.

A lateral position range Ydr1 (a range in the Y axis direction): −K3<Ydr1<−K4.

A center position (X, Y): ((−J3+J4)/2, (−K3+(−K4))/2).

Note that each of J3, J4, and K3 is a positive value, and K4 is a value equal to or larger than 0.

As described above, the range of the right blind spot area entering determination area DR1 includes the right blind spot area Rdr.

More specifically, each of the values of J3, J4, K3, and K4 is set as follows.

−J3 is a value smaller than the X coordinate position of the rear end of the own vehicle SV, and equal to or smaller than the X coordinate position of the rear end of the right blind spot area Rdr.

J4 is a value larger than the X coordinate position of the front end of the own vehicle SV, and equal to or larger than the X coordinate position of the front end of the right blind spot area Rdr.

−K4 is set to a value equal to or smaller than 0, and equal to or larger than the Y coordinate position of the right end of the own vehicle SV.

−K3 is set to a value smaller than the Y coordinate position of the right end of the own vehicle SV, and equal to or smaller than the Y coordinate position of the left end of the right blind spot area Rdr.

When the right blind spot area entering determination ON condition is satisfied, it can be considered that there is a high possibility (it is likely) that the three-dimensional object has entered the right blind spot area Rdr. Thus, in this case, the CPU makes a "Yes" determination at step 1428 and proceeds to step 1429 to set the value of the right blind spot area entering determination flag Xdr to "1". Thereafter, the CPU proceeds to step 1430.

In contrast, when the right blind spot area entering determination ON condition is not satisfied, the CPU makes a "No" determination at step 1428 to proceed to step 1430.

The CPU proceeds to step 1430 to determine the maximum extrapolation duration tg which is the maximum value/time of the time for which the extrapolation process of the fusion target object is allowed to be executed at longest. More specifically, the CPU determines the maximum extrapolation duration tg by applying the presence probability Trst of the previous fusion target object and the absolute value |Vxf| of the longitudinal relative speed of the previous fusion target object to a lookup table Map2 shown in the block B2. The relationship defined by the lookup table Map2 is represented by the graph shown in FIG. 9.

Then, the CPU proceeds to step 1435 and executes the above-described extrapolation process of the fusion target object to update/set the target object information of the estimated target object to the fusion target object information (the present fusion target object information) of the fusion target object at the time point of the present calculation timing. That is, the present fusion target object information is replaced by/with the target object information of the estimated target object. Thereafter, the CPU proceeds to step 1440 and increments the value of the number of consecutive extrapolated frames f of the fusion target object by "+1". Hereinafter, the fusion target object updated through the process of step 1435 and having the number of consecutive extrapolated frames f of 1 or more is referred to as a "fusion target object under extrapolation".

In contrast, at the time point at which the CPU executes the process of step 1425, when "the previous fusion target object which is the source of the estimated target object, of which the number of the sensor target objects capable of being fused/integrated has been "0", and which has been selected at step 1405" is the "fusion target object under extrapolation" (that is, the number of consecutive extrapolated frames f of the fusion target object is "1"), the CPU makes a "No" determination at step 1425. Then, the CPU proceeds to step 1445 to calculate a residual extrapolation time tg' by subtracting the extrapolation duration (=the calculation period Δt × the number of consecutive extrapolation frames f) from the maximum extrapolation duration tg.

Thereafter, the CPU proceeds to step 1450 to determine whether or not the residual extrapolation time tg' calculated at step 1445 is equal to or smaller than "0".

When the residual extrapolation time tg' is greater than 0, the CPU makes a "No" determination at step 1450 and proceeds to step 1435 to execute the extrapolation process of the fusion target object. In this manner, the "extrapolation of the fusion target object" is repeatedly performed every time the predetermined calculation period Δt elapses, unless the number of the sensor target objects to be able to be grouped to the estimated target object obtained at step 1410 is equal to or larger than 1. Thereafter, the CPU updates the value of the number of consecutive extrapolated frames f at step 1440, and proceeds to step 1424.

When the extrapolation process of the fusion target object is repeatedly executed, and thus, the residual extrapolation time tg' becomes equal to or smaller than 0, the CPU makes a "Yes" determination at step 1450 and proceeds to step 1455 to determine that the "fusion target object under extrapolation" has been lost. That is, the CPU determines that the fusion target object under extrapolation has disappeared/lost. In this case, the CPU sets the value of the number of consecutive extrapolated frames f to "0".

Here, as described above, when the sensor target object determined to be unable to be fused/integrated to the estimated target object is present, the value of the second grouping flag Xg2 is set to "1" at step 1335 shown in FIG. 13. When the value of the second grouping flag Xg2 is set to "1", a new fusion target object is attempted to be generated based on the sensor target object determined to be unable to be fused/integrated to the estimated target object through the execution of the second grouping routine shown in FIG. 15.

Figure 15:
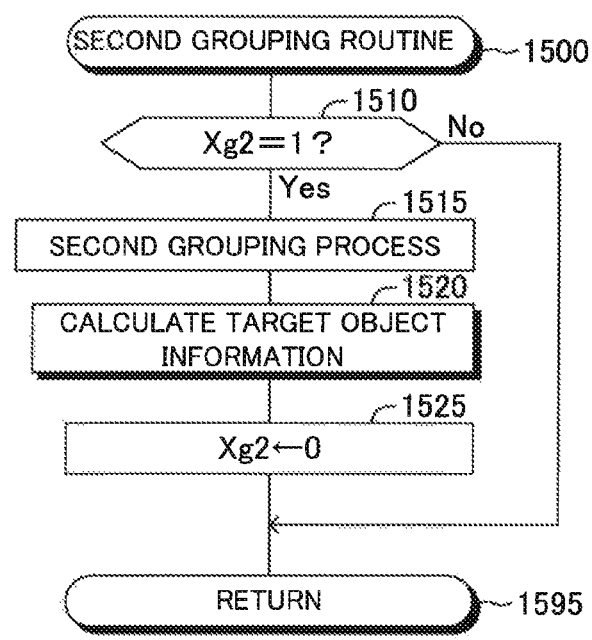
FIG. 15 is a flowchart for illustrating a routine executed by the CPU of the driving support ECU shown in FIG. 1.

Specifically, when an appropriate timing arrives, the CPU starts processing from step 1500 of the routine shown in FIG. 15 to proceed to step 1510, at which the CPU determines whether or not the value of the second grouping flag Xg2 is "1".

When the value of the second grouping flag Xg2 is "1", the CPU makes a "Yes" determination at step 1510 and sequentially executes the processes of steps 1515 to 1525 described below, then proceeds to step 1595 to tentatively terminate the present routine.

Step 1515: the CPU executes the above-described second grouping process.

Step 1520: the CPU calculates the fusion target object information of the new fusion target object which has been generated at step 1515. At this time point, the CPU sets the value of the calculation cycle number Cy included in the new fusion target object information to "1".

Step 1525: the CPU sets the value of the second grouping flag Xg2 to "0".

When the value of the second grouping flag Xg2 is "0" at the time point when the CPU executes the process of step 1510, the CPU makes a "No" determination at step 1510 and directly proceeds to step 1595 to tentatively terminate the present routine.

Figure 16:
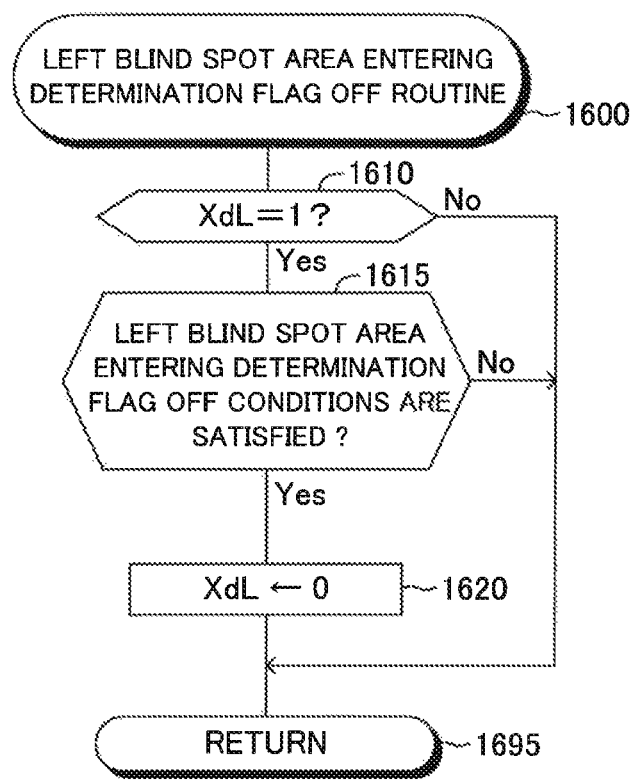
FIG. 16 is a flowchart for illustrating a routine executed by the CPU of the driving support ECU shown in FIG. 1.

In addition, the CPU executes a left blind spot area entering determination flag OFF routine shown in FIG. 16, every time the predetermined time Δt elapses. Therefore, when a predetermined timing arrives, the CPU starts processing from step 1600 of routine shown in FIG. 16, and proceeds to step 1610 to determine whether or not the value of the left blind spot area entering determination flag XdL is "1".

When the value of the left blind spot area entering determination flag XdL is "1", the CPU makes a "Yes" determination at step 1610 and proceeds to step 1615 to determine whether or not all of the following left blind spot area entering determination flag OFF conditions are satisfied.

The new fusion target object is generated (specified) through the new target object generation grouping process (step 1215) or through the second grouping process (step 1515); and the coordinate position (Xfs, Yfs) of the new fusion target object is within the left blind spot area leaving determination area DL2.
  The AGE of the new fusion target object becomes equal to or larger than the second threshold AGE.

It should be noted that, for example, the range of the left blind spot area leaving determination area DL2 is defined as follows (refer to FIG. 11):
  A longitudinal position range XdL2 (a range in the X axis direction): $-J1' < XdL2 < J2'$.
  A lateral position range YdrL2 (a range in the Y axis direction): $K1' < YdL2 < K2'$.
  A center position (X, Y): $((-J1'+J2')/2, (K1'+K2'))/2)$.
  Each of J1', J2', and K2' is a positive value, and K1' is a value equal to or larger than 0. As described above, the range of the left blind spot area leaving determination area DL2 includes the left blind spot area entering determination area DL1.

Specifically, each of these values is set as described below.
  −J1' is a value smaller than the X coordinate position of the rear end of the own vehicle SV, and equal to or smaller than the X coordinate position (−J1) of the rear end of the left blind spot area entering determination area DL1.
  J2' is a value larger than the X coordinate position of the front end of the own vehicle SV, and equal to or larger than the X coordinate position (J2) of the front end of the left blind spot area entering determination area DL1.
  K1' is set to a value equal to or larger than 0, and equal to or larger than the Y coordinate position (K1) of the left end of the left blind spot area entering determination area DL1.
  K2' is set to a value equal to or larger than the Y coordinate position (K2) of the left end of the left blind spot area entering determination area DL1.

When at least one of the left blind spot area entering determination flag OFF conditions is not satisfied, the CPU makes a "No" determination at step 1615 and proceed to step 1695 to tentatively terminate the present routine.

In contrast, when all of the left blind spot area entering determination flag OFF conditions are satisfied, it can be considered that it is likely that (there is a high possibility that) the three-dimensional object having a high possibility of having entered the left blind spot area RdL has come out of the left blind spot area RdL. Thus, in this case, the CPU makes a "Yes" determination at step 1615 and proceeds to step 1620 to set the value of the left blind spot area entering determination flag XdL to "0", and thereafter, the CPU proceeds to step 1695 to tentatively terminate the present routine.

Figure 17:
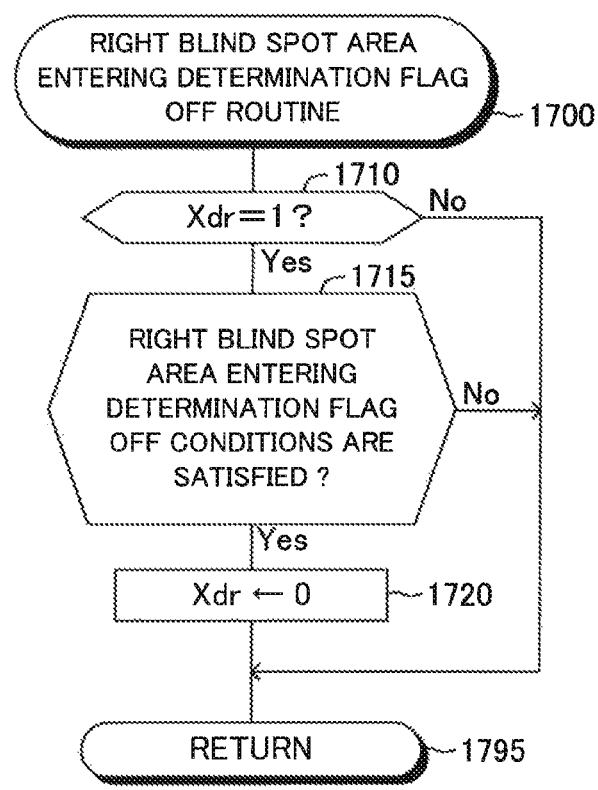
FIG. 17 is a flowchart for illustrating a routine executed by the CPU of the driving support ECU shown in FIG. 1.
Figure 18:
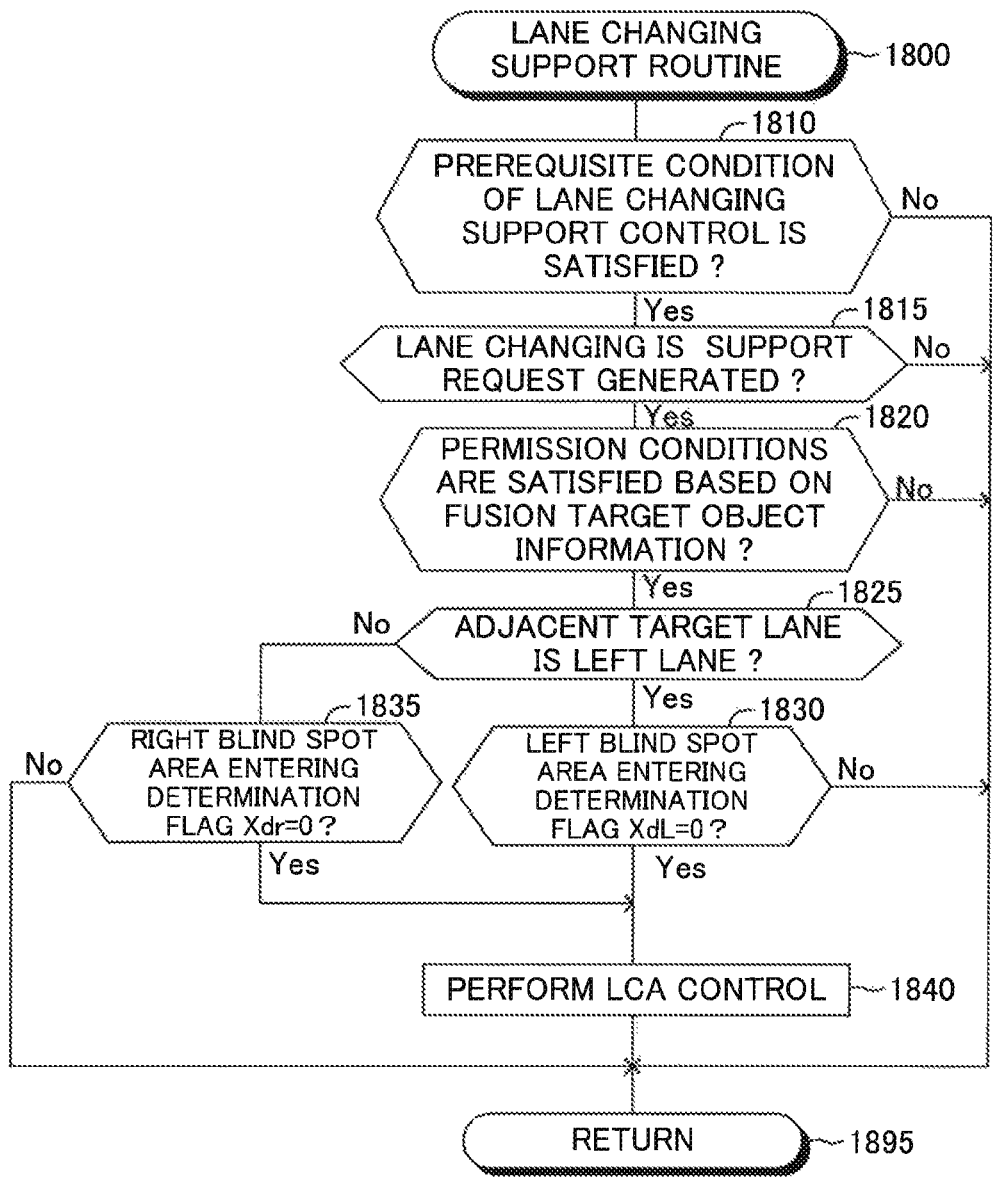
FIG. 18 is a flowchart for illustrating a routine executed by the CPU of the driving support ECU shown in FIG. 1.

In addition, the CPU executes the right blind spot area entering determination flag OFF routine shown in FIG. 17, every time the predetermined time Δt elapses. Therefore, when a predetermined timing arrives, the CPU starts processing from step 1700 of routine of FIG. 17, and proceeds to step 1710 to determine whether or not the value of the right blind spot area entering determination flag Xdr is "1".

When the value of the right blind spot area entering determination flag Xdr is "1", the CPU makes a "Yes" determination at step 1710 and proceeds to step 1715 to determine whether or not all of the following right blind spot area entering determination flag OFF conditions are satisfied.

The new fusion target object is generated (specified) through the new target object generation grouping process (step 1215) or through the second grouping process (step 1515); and the coordinate position (Xfs, Yfs) of the new fusion target object is within the right blind spot area leaving determination area DR2.
  The AGE of the new fusion target object becomes equal to or larger than the second threshold AGE.

It should be noted that, for example, the range of the right blind spot area leaving determination area DR2 is defined as follows (refer to FIG. 11):
  A longitudinal position range Xdr2 (a range in the X axis direction): $-J3' < Xdr2 < J4'$.
  A lateral position range Ydr2 (a range in the Y axis direction): $-K3' < Ydr2 < -K4'$.
  A center position (X, Y): $((-J3'+J4')/2, (-K3'+(-K4'))/2)$.
  Each of J3', J4', and K3' is a positive value, and K4' is a value equal to or larger than 0.

As described above, the range of the right blind spot area leaving determination area DR2 includes the right blind spot area entering determination area DR1.

Specifically, each of these values is set as described below.

−J3' is a value smaller than the X coordinate position of the rear end of the own vehicle SV and equal to or smaller than the X coordinate position (−J3) of the rear end of the right blind spot area entering determination area DR1.

J4' is a value larger than the X coordinate position of the front end of the own vehicle SV and equal to or larger than the X coordinate position (J4) of the front end of the right blind spot area entering determination area DR1.

−K4' is set to a value equal to or smaller than 0 and equal to or larger than the Y coordinate position (−K4) of the left end of the right blind spot area entering determination area DR1.

−K3' is set to a value equal to or larger than the Y coordinate position (−K3) of the right end of the right blind spot area entering determination area DR1.

When at least one of the right blind spot area entering determination flag OFF conditions is not satisfied, the CPU makes a "No" determination at step 1715 and proceeds to step 1795 to tentatively terminate the present routine.

In contrast, when all of the right blind spot area entering determination flag OFF conditions are satisfied, it can be considered that it is likely that (there is a high possibility that) the three-dimensional object having a high possibility of having entered the right blind spot area Rdr has come out of the right blind spot area Rdr. Thus, in this case, the CPU makes a "Yes" determination at step 1715 and proceeds to step 1720 to set the value of the right blind spot area entering determination flag Xdr to "0", and thereafter, the CPU proceeds to step 1795 to tentatively terminate the present routine.

In addition, the CPU executes a lane changing support execution routine, every time the predetermined time Δt elapses. Therefore, when a predetermined timing arrives, the CPU starts processing from step 1800 shown in FIG. 18, and proceeds to step 1810 to determine whether or not a prerequisite condition of the lane changing support control is satisfied. The prerequisite condition of the lane changing support control is satisfied when all of the following two conditions are satisfied.

The following-travel inter-vehicle-distance control and the lane keeping control are being performed (under execution).

The execution of the lane changing support control is selected through the operation switch 17.

When the prerequisite condition of the lane changing support control is not satisfied, the CPU makes a "No" determination at step 1810 and proceeds to step 1895 to tentatively terminate the present routine.

In contrast, when the prerequisite condition of the lane changing support control is satisfied, the CPU makes a "Yes" determination at step 1810 and proceeds to step 1815 to determine whether or not the lane changing support request to the left lane or the right lane is generated through the operation of the blinker lever.

When the lane changing support request to the left lane or the right lane is not generated, the CPU makes a "No" determination at step 1815 and proceeds to step 1895 to tentatively terminate the present routine.

When the lane changing support request to the left lane or the right lane is generated, the CPU makes a "Yes" determination at step 1815 and proceeds to step 1820 to determine whether or not permission condition of the lane changing support control is satisfied based on the fusion target object information. It should be noted that, when the CPU determines that the lane changing support request is generated at step 1815, the CPU may specify the adjacent target lane based on the lane changing support request, determine whether or not the white line which is the boundary between the own lane and the adjacent target lane is the broken line, and make a "Yes" determination at step 1815 to proceed to step 1820 when the white line which is the boundary is determined to be the broken line.

The permission condition of the lane changing support control in the present embodiment is satisfied when all of the following conditions are satisfied.

A collision margin time (time to collision) between the own vehicle SV and the fusion target object located in the adjacent target lane is equal to or longer than a threshold time.

It should be noted that this fusion target object includes the fusion target object under the extrapolation. The collision margin time is a value/time obtained through dividing the longitudinal distance of this fusion target object by the longitudinal relative speed of this fusion target object.

None of the fusion target object (including the fusion target object under the extrapolation) is present in an area just beside the own vehicle on the adjacent target lane side (that is, within a range from the X coordinate position of the front portion of the own vehicle to the X coordinate position of the end portion of the own vehicle SV).

When the permission condition of the lane changing support control is not satisfied, the CPU makes a "No" determination at step 1820 and proceeds to tentatively terminate the present routine.

When the permission condition of the lane changing support control is satisfied, the CPU makes a "Yes" determination at step 1820 and proceeds to step 1825 to determine whether or not the lane changing support request is the request of the lane change to the left. That is, the CPU determines whether or not the adjacent target lane is the left lane.

When the adjacent target lane is the left lane, the CPU makes a "Yes" determination at step 1825 and proceeds to step 1830 to determine the value of the left blind spot area entering determination flag XdL is set at "0".

When the value of the left blind spot area entering determination flag XdL is set at "0", the CPU makes a "Yes" determination at step 1830 and proceeds to step 1840 to perform the lane changing support control to the left lane.

In contrast, when the value of the left blind spot area entering determination flag XdL is set at "1", there is a high possibility that the three-dimensional object (a vehicle other than the own vehicle SV) is present in the left blind spot area RdL. That is, a situation is occurring where the lane changing support control to the left lane is not permitted.

Therefore, in this case, the CPU makes a "No" determination at step 1830 and directly proceeds to step 1895 to tentatively terminate the present routine. That is, the CPU does not perform the lane changing support control to the left lane (that is, the lane changing support control to the left lane is prohibited).

When the lane changing support request is not the request of the lane change to the left (the adjacent target lane is not the left lane), in other words, when the lane changing support request is the request of the lane change to the right, the CPU makes a "No" determination at step 1825 and proceeds to step 1835 to determine whether or not the value of the right blind spot area entering determination flag Xdr is set at "0".

When the right blind spot area entering determination flag Xdr is set at "0", the CPU makes a "Yes" determination at step 1835 and proceeds to step 1840 to perform the lane changing support control to the right lane.

In contrast, when the value of the right blind spot area entering determination flag Xdr is set at "1", there is a high possibility that the three-dimensional object (a vehicle other than the own vehicle SV) is present in the right blind spot area RdL. That is, a situation is occurring where the lane changing support control to the right lane is not permitted. Therefore, in this case, the CPU makes a "No" determination at step 1835 and directly proceeds to step 1895 to tentatively terminate the present routine. That is, the CPU does not perform the lane changing support control to the right lane (that is, the lane changing support control to the right lane is prohibited).

As described above, even when the first apparatus determines that the fusion target object has been lost (has disappeared) at the time point at which the extrapolation continues to be performed for the maximum extrapolation duration (that is, even when the condition of step 1820 is satisfied), if the first apparatus determines that the three-dimensional object corresponding to the fusion target object is highly likely to stay in the blind spot area, the first apparatus can prohibit the lane changing support control to the lane on the side where that blind spot area is present.

Further, according to the first apparatus, from when the three-dimensional object corresponding to the fusion target object is highly likely to have come out of the blind spot area Rd, the execution of the lane changing support control to the lane where the blind spot area Rd is present is permitted. Therefore, the first apparatus can reduce a possibility of the executing the lane changing support control in a case where there is a high possibility that the three-dimensional object is present in the blind spot area.

Second Embodiment

Next, a lane changing support apparatus according to the second embodiment of the present invention (hereinafter, also referred to as a "second apparatus") will be described.

<Outline of Operation>

The second apparatus differs from the first apparatus only in the following point. That is, in a period from a time point at which a determination (hereinafter, referred to as a "blind spot area entering determination") that a three-dimensional object corresponding to the extrapolation target fusion target object was highly likely to enter the blind spot area Rd to a time point at which a determination that the three-dimensional object is highly likely to come out of the blind spot area Rd is made, when an event occurs where it can be considered that the "blind spot area entering determination" was erroneously made, the second apparatus sets the "state for allowing of executing the lane changing support control in which the adjacent target lane is set to the fusion target object presence side lane" to the "execution-permitted state".

More specifically, the DSECU determines whether or not one of the following determination cancellation conditions (conditions 1 to 4) is satisfied. When the DSECU determines that at least one of the conditions 1 to 4 is satisfied, the DSECU sets the "state for allowing of executing the lane changing support control in which the adjacent target lane is set to the fusion target object presence side lane" to the "execution-permitted state", even before the DSECU determines that The three-dimensional object which has been determined to have a high possibility of having entered the blind spot area Rd is highly likely to have come out of this blind spot area Rd.

The determination cancellation condition 1: when the extrapolation target fusion target object presence side lane is the left side lane, and when the state for allowing of executing the lane changing support control in which the adjacent target lane is set to the left side lane is set to the execution-prohibited state (that is, XdL=1), the fusion target having a high presence probability has newly entered the range of "the left blind spot area leaving determination area DL2".

The determination cancellation condition 2: when the extrapolation target fusion target object presence side lane is the right side lane, and when the state for allowing of executing the lane changing support control in which the adjacent target lane is set to the right side lane is set to the execution-prohibited state (that is, Xdr=1), the fusion target having a high presence probability has newly entered the range of "the right blind spot area leaving determination area DR2".

The reason why the determination cancellation conditions 1 and 2 are set is as follows. That is, when "the fusion target object having a high presence probability" enters "the blind spot area leaving determination area in the side of the extrapolation target fusion target object presence side lane" while the state for allowing of executing the lane changing support control is set to the execution-prohibited state, it can be determined that there is a high possibility that the three-dimensional object has not been present in "the blind spot area Rd in the side of the extrapolation target fusion target object presence side lane" from the first.

A method for determining whether or not the determination cancellation conditions 1 or 2 is satisfied is as follows. That is, the DSECU determines that the determination cancellation condition 1 or condition 2 is satisfied, when the fusion target object (an outer shape of the fusion target object) having the presence probability Trst equal to or larger than the threshold presence probability and "the blind spot area leaving determination area in the side of the extrapolation target fusion target object presence side lane" have an overlapping part.

It should be noted that, when a center coordinate position (ARx, ARy) of the blind spot area leaving determination area (the left blind spot area leaving determination area or the right blind spot area leaving determination area) and "the coordinate position (Xf, Yf), the length Lf, and the width Wf" of the fusion target having the presence probability Trst equal to or larger than the threshold presence probability satisfy both of the following relational expressions, the DSECU can determine that the fusion target object and the blind spot area leaving determination area include the overlapping part.

$|Xf-ARx| < \{(\text{a length of the blind spot area leaving determination area} \times 0.5) + (\text{the length } Lf \text{ of the fusion target object} \times 0.5)\}$ $|Yf-ARy| < \{(\text{the length of the blind spot area leaving determination area} \times 0.5) + (\text{the length } Lf \text{ of the fusion target object} \times 0.5)\}$ The determination cancellation condition 3: the driver performs the steering operation (overriding steering operation) to lane changes to the extrapolation target fusion target object presence side lane or the opposite lane to the extrapolation target fusion target object presence side lane.

A method for determining whether or not the determination cancellation condition 3 is satisfied will be described below. If the three-dimensional object is present in the blind spot area Rd on the side of the extrapolation target fusion target object presence side lane, it can be considered that the driver will not perform such a steering operation as to change lanes to the extrapolation target fusion target object presence side lane. Nevertheless, when the lane change to that lane is performed through the steering operation of the driver, it can be determined that there is a high possibility that the three-dimensional object is not present in the blind spot area Rd on the side of the extrapolation target fusion target object presence side lane. Further, when the lane change to the opposite lane to the extrapolation target fusion target object presence side lane is performed through the steering operation of the driver, it is very difficult for the three-dimensional object present in the blind spot area Rd to stay in this blind spot area Rd through following a lateral movement of the own vehicle. Therefore, in this case, it can be determined that there is a high possibility that the three-dimensional object has not been present in the blind spot area Rd on the side of the extrapolation target fusion target object presence side lane.

In view of the above, the method for determining whether or not the determination cancellation condition 3 is satisfied is as follows. That is, when at least one of the following three conditions becomes satisfied, the DSECU determines that the determination cancellation condition 3 is satisfied. It should be noted that, in the following three conditions, the left and right moving directions of the own vehicle SV are not considered.

The own vehicle SV passes through the boundary white line between the lane in which the own vehicle SV is traveling and the left lane.

The own vehicle SV passes through the boundary white line between the lane in which the own vehicle SV is traveling and the right lane.

An amount of lateral movement of the own vehicle SV becomes equal to or larger than a threshold movement amount through the steering operation of the driver.

More specifically, the DSECU determines that the amount of lateral movement of the own vehicle SV has become equal to or larger than the threshold movement amount, when a magnitude (absolute value) of a difference between an "offset value (lateral deviation Dy) with respect to the center of the white lines (the lane center line CL) obtained at a time point at which the blind spot area entering determination flag has changed form OFF to ON" and an "offset value (lateral deviation Dy) with respect to the center of the white lines at a present time point" becomes equal to or larger than a predetermined value. It should be noted that the predetermined value is appropriately set to a value appropriate for this determination. The steering operation of the driver is detected based on the steering torque Tra.

The determination cancellation condition 4: the own vehicle SV is traveling at a low speed.

When the own vehicle SV is traveling at a very low speed, the fusion target which has entered the blind spot area Rd is unlikely to travel so as to follow the own vehicle SV for a long time. Thus, in this case, it can be determined that there is a high possibility that the three-dimensional object corresponding to the extrapolation target fusion target object is not present in the blind spot area Rd.

A method for determining whether the determination cancellation condition 4 is satisfied is described below. That is, the DSECU determines whether or not the vehicle speed of the own vehicle SV is lower than a threshold vehicle speed (threshold low vehicle speed), and the DSECU determines that the determination cancellation condition 4 is satisfied when the DSECU determines that the vehicle speed of the own vehicle SV is lower than the threshold vehicle speed (threshold low vehicle speed). It should be noted that this threshold vehicle speed is set to an arbitrary vehicle speed appropriate for this determination.

The determination cancellation condition 5: a state where the fusion target object has been lost continues for a very long time.

When a very long period of time has passed where the fusion target object which was determined to enter the blind spot area Rd has been lost, it can be determined that there is a high possibility that the three-dimensional object corresponding to that fusion target object is not present in the blind spot area Rd.

In this case, the DSECU determines that the determination cancellation condition 5 becomes satisfied, when an elapsed time from at the time point when the blind spot area entering determination flag (XdL or Xdr) changed from "0" to "1" becomes longer than the threshold time. It should be noted that the threshold time is set to an arbitrary time for this determination.

<Specific Operation>

The CPU of the second apparatus executes the same routines (routines shown in FIGS. 12 to 18) as the routines executed by the first apparatus, except differences described below.

The CPU of the second apparatus further makes determinations, in addition to the above-described determination, as to whether or not one of the determination cancellation conditions 1 to 5 is satisfied, at each of step 1615 and step 1715. That is, the CPU makes a "Yes" determination at step 1615 (step 1715) to proceed to step 1620 (step 1720), when at least one of the determination cancellation conditions 1 to 5 and the above described conditions is satisfied at step 1615 (step 1715). In contrast, the CPU makes a "No" determination at step 1615 (step 1715) to proceed to step 1695 (step 1795) to tentatively terminate the present routine, when none of the determination cancellation conditions 1 to 5 and the above described conditions is satisfied at step 1615 (step 1715).

As described above, the second apparatus has the same effect as the first apparatus. In addition, according to the second apparatus, when the three-dimensional object is not actually present in the blind spot area, "the possibility that the lane changing support control to the lane on the blind spot area presence side is prohibited due to the erroneous determination that the three-dimensional object is present can be reduced. As a result, it is possible to reduce the possibility that the lane changing support control to the lane on the blind spot area presence side is erroneously prohibited.

Modified Examples

Although each of the embodiments of the present invention has been specifically described above, the present invention is not limited to each of the above embodiments, and various modifications based on the technical idea of the present invention are possible.

For example, each of the first apparatus and the second apparatus, which uses the fusion target object as the determinative target object indicative of the three-dimensional target object present in the surroundings of the own vehicle, may use, in place of this fusion target object, a "target object indicative of the three-dimensional object" which is specified using one single sensor target as the determinative target object (the target object to be used to determine whether or not the lane changing support control is safely performed). Further, for example, the first apparatus and the second apparatus may use "the target object indicative of the three-dimensional object which has been generated by another method different from the generating method of the fusion target object" as the determinative target object.

For example, the second apparatus may be configured to determine whether or not a combination of any one or more of the determination cancellation conditions 1 to 5 is satisfied. For example, in each of the above-described embodiments, the execution of the following-travel inter-vehicle-distance control and the lane keeping control is the prerequisite for performing the lane changing support control. However, such a prerequisite is not necessarily required.

What is claimed is:

1. A lane changing support apparatus comprising:
   a plurality of radar sensors, each of which transmits radar wave to surroundings of an own vehicle to detect a reflection point of a three-dimensional object of said radar wave as a sensor target object, and detects position-and-speed information to specify a position and a speed of said detected sensor target object with respect to said own vehicle;
   target object specifying means for specifying, every time a predetermined time elapses, a determinative target object indicative of a three-dimensional object present around said own vehicle using said position-and-speed information;
   control execution means for performing a lane changing support control to control a steering angle of said own vehicle so as to support a traveling of said own vehicle when said vehicle changes lanes from an own lane in which said own vehicle is traveling to a target adjacent lane adjacent to said own lane; and
   control prohibiting means:
      for, in a case where said sensor target object corresponding to a previous determinative target object which is said determinative target object specified said predetermined time before is not detected, determining that it is highly likely that an attention determinative target object has entered a blind spot area in which any of said radar sensors cannot detect any of said sensor target objects to prohibit said control execution means from performing said lane changing support control, when a blind spot area entering determination condition is satisfied, said blind spot area entering determination condition including a first condition and a second condition, said first condition being a condition satisfied when a magnitude of a speed relative to said own vehicle of said attention determinative target object being said previous determinative target object to which said target object which is not detected corresponds is smaller than a threshold relative speed, and said second condition being a condition satisfied when a position of said attention determinative target object with respect to said own vehicle is within a blind spot area entering determination area which includes a whole of said blind spot area.

2. The lane changing support apparatus according to claim 1, wherein,
   said target object specifying means is configured to acquire a reliability of said determinative target object, in such a manner that said reliability becomes larger as a time for which said determinative target object is continuously specified becomes longer; and
   said control prohibiting means is configured to determine that said blind spot area entering determination condition is satisfied, when a condition that said reliability of said attention determinative target object is equal to or larger than a first threshold reliability is further satisfied.

3. The lane changing support apparatus according to claim 1, wherein,
   said control prohibiting means is configured to determine that it is highly likely that said attention determinative target object has come out of said blind spot area to permit said control execution means to perform said lane changing support control, when a blind spot area leaving determination condition is satisfied in a period for which said lane changing support control is prohibited, said blind spot area leaving determination condition including a condition satisfied when said target specifying means newly specifies said determinative target object and a condition satisfied when a position of said newly specified determinative target object with respect to said own vehicle is within a blind spot area leaving determination area which includes said blind spot area entering determination area.

4. The lane changing support apparatus according to claim 3, wherein,
   said target object specifying means is configured to acquire a reliability of said determinative target object, in such a manner that said reliability becomes larger as a time for which said determinative target object is continuously specified becomes longer; and
   said control prohibiting means is configured to determine that said blind spot area leaving determination condition is satisfied, when a condition that said reliability of said newly specified determinative target object is equal to or larger than a second threshold reliability is further satisfied.

5. The lane changing support apparatus according to claim 3, wherein,
   said target object specifying means is configured:
      to continuously execute, unless said sensor target object corresponding to said attention determinative target object is detected, based on said position and said speed of said attention determinative target object with respect to said own vehicle, an extrapolation process for specifying an extrapolation determinative target object corresponding to said attention determinative target object until a maximum extrapolation duration elapses; and
      to determine that a three-dimensional object corresponding to said attention determinative target object is lost, when said extrapolation process is continuously executed until said maximum extrapolation duration elapses;
   said control execution means is configured to perform said lane changing support control, when determining, based on positions and speeds of said specified determinative target object and said attention determinative target object before being determined to be lost with respect to said own vehicle, that three-dimensional objects represented by the specified determinative target object and attention determinative target object are not obstacles in performing said lane changing support control; and said control prohibiting means is configured to prohibit said control execution means from performing said lane changing support control, when said blind spot area leaving determination condition is not satisfied after said blind spot area entering determination condition is satisfied, even after it is determined that said three-dimensional object corresponding to said attention determinative target object has been lost.

6. The lane changing support apparatus according to claim 1, wherein, said target object specifying means is configured to calculate a presence probability of said determinative target object; and said control prohibiting means is configured to permit said control execution means to perform said lane changing support control in a period for which said control prohibiting means prohibits said control execution means from performing said lane changing support control, when another determinative target object, which is different from said attention determinative target object and whose presence probability is equal to or larger than a threshold presence probability, enters a predetermined area within said blind spot leaving determination area.

7. The lane changing support apparatus according to claim 1, wherein, said control prohibiting means is configured to permit said control execution means to perform said lane changing support control in a period for which said control prohibiting means prohibits said control execution means from performing said lane changing support control, when said steering angle is changed through a steering operation of said driver of said own vehicle to override said lane changing support control so that said own vehicle deviates from said own lane.

8. The lane changing support apparatus according to claim 1, wherein, said control prohibiting means is configured to permit said control execution means to perform said lane changing support control in a period for which said control prohibiting means prohibits said control execution means from performing said lane changing support control, when said speed of said own vehicle becomes smaller a threshold speed.

9. The lane changing support apparatus according to claim 1, wherein, said control prohibiting means is configured to permit said control execution means to perform said lane changing support control, when an elapsed time from at a time point when said control prohibiting means prohibits said control execution means from performing said lane changing support control becomes longer than a threshold time.

* * * * *